United States Patent
Huang et al.

(10) Patent No.: US 10,826,758 B2
(45) Date of Patent: Nov. 3, 2020

(54) METHOD AND APPARATUS FOR CONTROL RESOURCE MONITORING CONSIDERING BEAM FAILURE RECOVERY IN A WIRELESS COMMUNICATION SYSTEM

(71) Applicant: ASUSTek Computer Inc., Taipei (TW)

(72) Inventors: Chun-Wei Huang, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 162 days.

(21) Appl. No.: 16/275,982

(22) Filed: Feb. 14, 2019

(65) Prior Publication Data

US 2019/0253308 A1    Aug. 15, 2019

Related U.S. Application Data

(60) Provisional application No. 62/630,458, filed on Feb. 14, 2018.

(51) Int. Cl.
| | |
|---|---|
| *H04L 12/24* | (2006.01) |
| *H04W 72/04* | (2009.01) |
| *H04W 72/10* | (2009.01) |
| *H04L 25/02* | (2006.01) |

(52) U.S. Cl.
CPC ...... *H04L 41/0654* (2013.01); *H04L 25/0202* (2013.01); *H04W 72/042* (2013.01); *H04W 72/046* (2013.01); *H04W 72/0466* (2013.01); *H04W 72/10* (2013.01)

(58) Field of Classification Search
CPC .................. H04L 41/0654; H04W 72/042
See application file for complete search history.

(56) References Cited

U.S. PATENT DOCUMENTS

| | | | | |
|---|---|---|---|---|
| 10,686,505 | B2* | 6/2020 | Lee .................. | H04B 7/0645 |
| 2017/0013611 | A1* | 1/2017 | Dinan ............... | H04W 52/146 |
| 2019/0075014 | A1* | 3/2019 | Zhou ................ | H04W 72/042 |
| 2019/0082335 | A1* | 3/2019 | Yu .................... | H04W 24/04 |
| 2019/0082471 | A1* | 3/2019 | Tsai .................. | H04L 5/0048 |
| 2019/0097874 | A1* | 3/2019 | Zhou ................ | H04L 5/0023 |
| 2019/0141546 | A1* | 5/2019 | Zhou ................ | H04W 72/0413 |

(Continued)

FOREIGN PATENT DOCUMENTS

WO     2017138978     8/2017

*Primary Examiner* — Parth Patel
(74) *Attorney, Agent, or Firm* — Blue Capital Law Firm, P.C.

(57) ABSTRACT

A method and apparatus are disclosed. The method includes the UE (User Equipment) being configured with a first CORESET (Control Resource Set). The method also includes the UE being configured with a second CORESET. The method further includes the UE transmitting a preamble for beam failure recovery in response to the UE detecting that beam failure occurs. And the method includes the UE monitoring and/or receiving a DCI scrambled by C-RNTI in the second CORESET in the second slot in response to transmitting the preamble for beam failure recovery. Furthermore, the method includes the UE prioritizing to receive and/or demodulate the DCI scrambled by C-RNTI in the second CORESET in the second slot, if the first number plus the third number exceeds the first maximum number or the second number plus the fourth number exceeds the second maximum number in the second slot.

20 Claims, 10 Drawing Sheets

(56) References Cited

U.S. PATENT DOCUMENTS

| | | | |
|---|---|---|---|
| 2019/0150161 A1* | 5/2019 | Cheng | H04L 5/001 |
| | | | 370/330 |
| 2019/0166555 A1* | 5/2019 | Cheng | H04W 72/0446 |
| 2019/0190582 A1* | 6/2019 | Guo | H04B 7/088 |
| 2019/0200248 A1* | 6/2019 | Basu Mallick | H04B 7/0695 |
| 2019/0207662 A1* | 7/2019 | Zhou | H04W 72/042 |
| 2019/0207667 A1* | 7/2019 | Zhou | H04B 7/0626 |
| 2019/0207737 A1* | 7/2019 | Babaei | H04L 27/2607 |
| 2019/0215048 A1* | 7/2019 | Cirik | H04B 7/088 |
| 2019/0215706 A1* | 7/2019 | Tsai | H04W 72/042 |
| 2019/0215863 A1* | 7/2019 | Kim | H04W 74/02 |
| 2019/0215870 A1* | 7/2019 | Babaei | H04W 72/042 |
| 2019/0215897 A1* | 7/2019 | Babaei | H04W 76/28 |
| 2019/0239212 A1* | 8/2019 | Wang | H04L 5/0053 |
| 2019/0253127 A1* | 8/2019 | Kang | H04L 5/00 |
| 2019/0253308 A1* | 8/2019 | Huang | H04W 72/0466 |
| 2019/0253941 A1* | 8/2019 | Cirik | H04W 36/0072 |
| 2019/0254042 A1* | 8/2019 | Cirik | H04W 56/001 |
| 2019/0387550 A1* | 12/2019 | Pan | H04L 5/0094 |
| 2020/0067685 A1* | 2/2020 | Awad | H04L 5/0053 |
| 2020/0119839 A1* | 4/2020 | Jo | H04B 7/06 |
| 2020/0128588 A1* | 4/2020 | Xiong | H04W 56/0015 |
| 2020/0221428 A1* | 7/2020 | Moon | H04W 72/12 |

* cited by examiner

| CCE Aggregation Level | Number of Candidates |
|---|---|
| 4 | 4 |
| 8 | 2 |
| 16 | X |

FIG. 5 (PRIOR ART)

| REG bundle size | $R_{H\tilde{H}}$ | $R_{\tilde{H}\tilde{H}}^{-1}$ | $\tilde{H}$ | # of multiplications |
|---|---|---|---|---|
| 2 | 24x6 matrix | 6x6 matrix | 6x1 matrix | 3024 |
| 3 | 36x9 matrix | 9x9 matrix | 9x1 matrix | 6480 |
| 6 | 72x18 matrix | 18x18 matrix | 18x1 matrix | 24624 |

FIG. 6 (PRIOR ART)

METHOD AND APPARATUS FOR CONTROL RESOURCE MONITORING CONSIDERING BEAM FAILURE RECOVERY IN A WIRELESS COMMUNICATION SYSTEM

CROSS-REFERENCE TO RELATED APPLICATIONS

The present Application claims the benefit of U.S. Provisional Patent Application Ser. No. 62/630,458 filed on Feb. 14, 2018, the entire disclosure of which is incorporated herein in its entirety by reference.

FIELD

This disclosure generally relates to wireless communication networks, and more particularly, to a method and apparatus for control resource monitoring considering beam recovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE being configured with a first CORESET (Control Resource Set), wherein (i) the first CORESET is not used to monitor and/or receive a DCI (Downlink Control Information) scrambled by C-RNTI (Cell Radio Network Temporary Identifier) in response to transmitting a preamble for beam failure recovery, (ii) the UE is configured to perform a first number of channel estimation attempts and a second number of blind decode attempts for receiving and/or monitoring the PDCCH(s) (Physical Downlink Control Channel) candidates in the first CORESET in a first slot, and (iii) the UE is configured to perform the first number of channel estimation attempts and the second number of blind decode attempts for receiving and/or monitoring the PDCCH(s) candidates in the first CORESET in a second slot. The method also includes the UE being configured with a second CORESET, wherein (i) the second CORESET is not used to monitor and/or receive DL (Downlink) transmission if the UE does not transmit a preamble for beam failure recovery, (ii) the second CORESET is used to monitor and/or receive a DCI scrambled by C-RNTI in response to transmitting a preamble for beam failure recovery, and (iii) the UE is configured to perform a third number of channel estimation attempts and a fourth number of blind decode attempts for receiving and/or monitoring the PDCCH(s) candidates in the second CORESET in the second slot. The method further includes the UE transmitting a preamble for beam failure recovery in response to the UE detecting that beam failure occurs. In addition, the method includes the UE monitoring and/or receiving a DCI scrambled by C-RNTI in the second CORESET in the second slot in response to transmitting the preamble for beam failure recovery. Furthermore, the method includes the UE prioritizing to receive and/or demodulate the DCI scrambled by C-RNTI in the second CORESET in the second slot, if the first number plus the third number exceeds the first maximum number or the second number plus the fourth number exceeds the second maximum number in the second slot.

BRIEF DESCRIPTION OF THE DRAWINGS

FIG. 5 is a reproduction of Table 10.1-1 of 3GPP R1-1801293.

FIG. 6 is a reproduction of Table 1 of 3GPP R1-1800372.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO, INC.; 3GPP RAN2 #94 meeting minute; R2-162251, "RAN2 aspects of high frequency New RAT", Samsung; Final Chairman's Note of 3GPP TSG RAN WG1 Meeting #90 (Prague, Czech Republic, 21-25 Aug. 2017); Final Chairman's Note of 3GPP TSG RAN WG1 Meeting # AH_NR3 (Nagoya, Japan, 18-21 Sep. 2017); Final Chairman's Note of 3GPP TSG RAN WG1 Meeting #90bis (Prague, Czech Republic, 9-13 Oct. 2017) (updated with email approvals); Final Chairman's Note of 3GPP TSG RAN WG1 Meeting # AH_NR3 (Nagoya, Japan, 18-21 Sep. 2017); Final Chairman's Note of 3GPP TSG RAN WG1 Meeting #90bis (Prague, CZ, 9th-13th, Oct. 2017) (updated with email approvals); Final Chairman's Note of 3GPP TSG RAN WG1 Meeting #91 (Reno, USA, 27 Nov.-1 Dec. 2017); Final Chairman's Note of 3GPP TSG RAN WG1 Meeting # AH_1801 (Vancouver, Canada, 22-26 Jan. 2018); and R1-1801293, "draftCR to 38.213 capturing the agreements from the RAN1 NR ad-hoc 1801 meeting", Samsung; and R1-1800372, "Remaining issues on search space", LG Electronics. The standards and documents listed above are hereby expressly incorporated by reference in their entirety.

Figure 1:
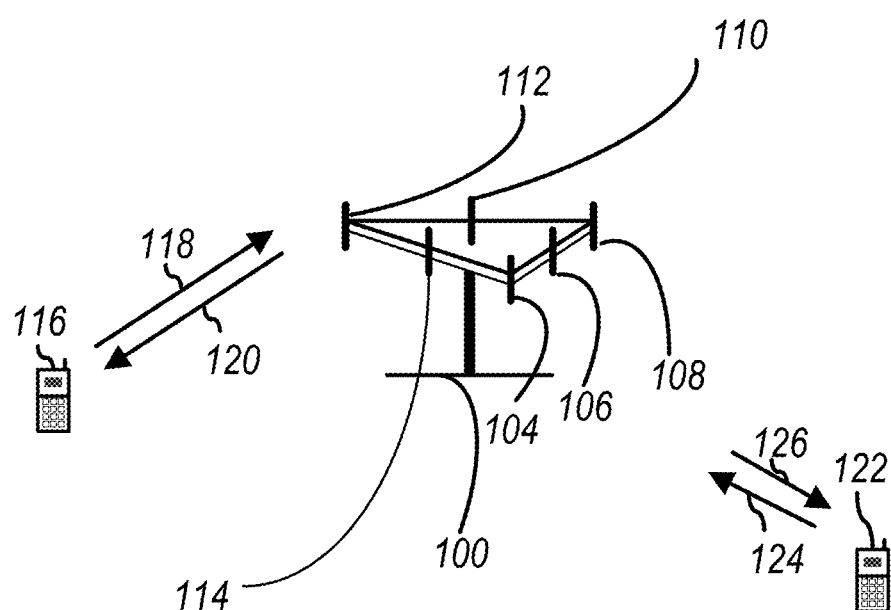
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
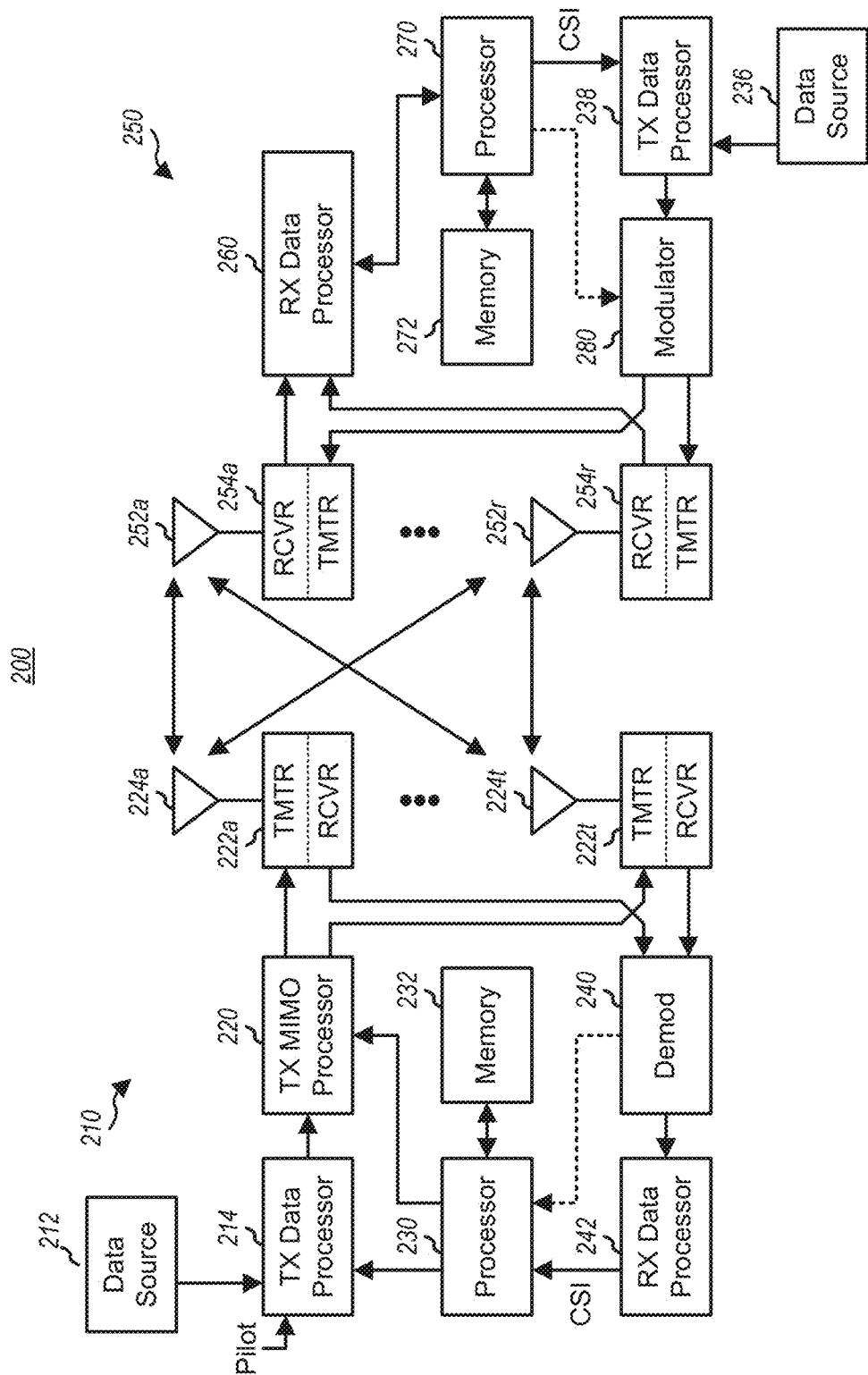
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
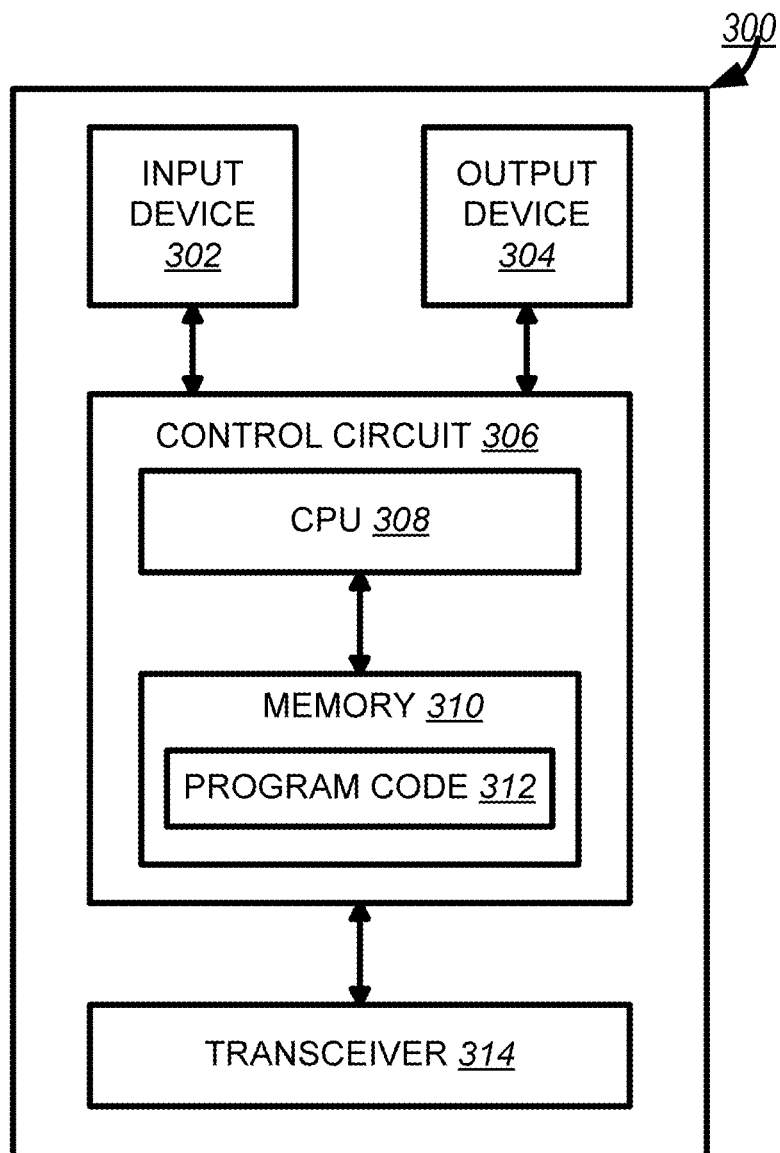
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
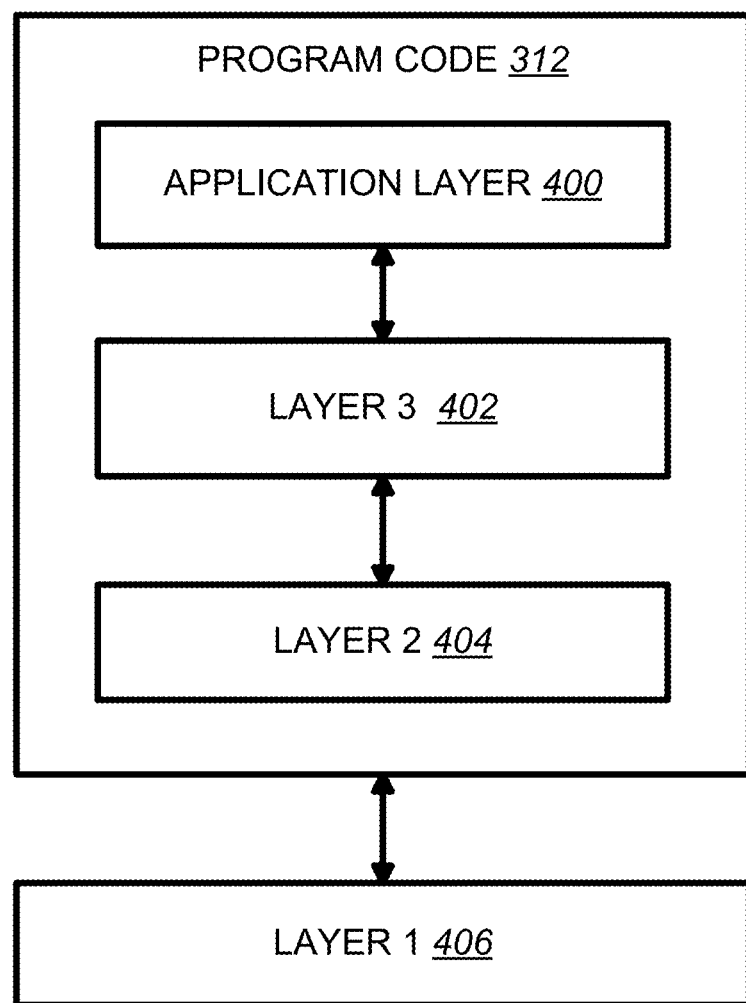
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

There are some agreements on beam management in RAN1 #90bis meeting, as described in the Final Chairman's Note of 3GPP TSG RAN WG1 Meeting #90bis (Prague, Czech Republic, 9-13 Oct. 2017) as follows:
Agreement:
  gNB response is transmitted via a PDCCH addressed to C-RNTI
    FFS: DCI format for gNB response
    Dedicated CORESET(s) is applied for monitoring gNB response for BFRQ. The CORESET is down-selected from the following two alternatives:
      Alt 1: the same CORESET (s) as before beam failure
      Alt 2: dedicatedly configured CORESET for beam failure recovery.
Agreement:
Specification supports the CSI-RS+SS block case for the purpose of new candidate beam identification
  The above case is configured by gNB
  Note: a dedicated PRACH resource is configured to either an SSB or a CSI-RS resource
  Following two scenarios are supported when a UE is configured with CSI-RS+SSB
    Scenario 1: PRACHs are associated to SSBs only
      In this scenario, CSI-RS resources for new beam identification can be found from the QCL association to SSB(s).
    Scenario 2: Each of the multiple PRACHs is associated to either an SSB or a CSI-RS resource
  FFS: multiple SSB can be associated with the same uplink resource.
CATT has concerns on the above agreement that it may not be an essential feature for beam failure recovery [ . . . ]
Agreement:
  For gNB to uniquely identify UE identity from a beam failure recovery request transmission
    A PRACH sequence is configured to UE
Working Assumption:
  At least the following parameters should be configured for dedicated PRACH resources for beam failure recovery
    Per UE parameters
      Preamble sequence related parameters
        E.g., root sequence, cyclic shift, and preamble index
      Maximum number of transmissions
      Maximum number of power rampings
      Target received power
      Retransmission Tx power ramping step size
      Beam failure recovery timer
    Per dedicated PRACH resource parameters
      Frequency location information
      Time location, if it is only a subset of all RACH symbols (e.g., PRACH mask)
      Associated SSB or CSI-RS information
    Note: as a starting point, use initial access preamble transmission mechanism and parameters. If any issue is identified, new mechanism can be introduced.
      No further RRC signalling for above UE parameters is required if reusing the same parameter as initial access [ . . . ]
Agreements:
Support RRC configuration of a time duration for a time window and a dedicated CORESET for a UE to monitor gNB response for beam failure recovery request.
  UE assumes that the dedicated CORESET is spatial QCL'ed with DL RS of the UE-identified candidate beam in the beam failure recovery request.
  FFS: multiple dedicated CORESETs can be configured to a UE, where each CORESET can have different spatial QCL configuration
  Note: the time window is determined by a fixed time offset defined in the spec with respect to beam failure recovery request transmission and the RRC configurable time duration starting from the fixed time offset.
  FFS the value of fixed time offset k (slots). [ . . . ]
Agreement:
  In the case of collision of SRS and short PUCCH carrying only CSI report/beam failure recover request, support the prioritization rules in the table below:
    The channel listed in the entries below are prioritized

| | Aperiodic SRS | Semi-persistent SRS | periodic SRS |
|---|---|---|---|
| sPUCCH with aperiodic CSI report only | No rule** | sPUCCH | sPUCCH |
| sPUCCH with semi persistent CSI report only | SRS | sPUCCH | sPUCCH |

|  | Aperiodic SRS | Semi-persistent SRS | periodic SRS |
| --- | --- | --- | --- |
| sPUCCH with periodic CSI report only | SRS | sPUCCH | sPUCCH |
| sPUCCH with beam failure recover request* | sPUCCH | sPUCCH | sPUCCH |

In case SRS is dropped, dropping can be partial in time domain, i.e., only those OFDM symbols that collide with short PUCCH
*If short PUCCH is supported for beam failure recovery request and collision between short PUCCH with beam failure recovery request and aperiodic/semi persistent/periodic SRS occurs, prioritize short PUCCH
**UE can assume that this collision will not occur Agreements
PDCCH candidates having different DCI payload sizes count as separate blind decodes
PDCCH candidates comprised by different sets of CCE(s) count as separate blind decodes.
PDCCH candidates in different CORESETs count as separate blind decodes.
PDCCH candidates having the same DCI payload size and comprised by the same set of CCE(s) in the same CORESET count as one blind decodes.
Agreements:
For non-CA and for PDCCH monitoring periodicity of 14 or more symbols, the maximum number of PDCCH blind decodes per slot is:
Working assumption: 44 for SCS=15 kHz.
Working assumption: less than 44 at least for SCS=60 kHz and 120 kHz.
For the given SCS, all UEs support the maximum number of PDCCH blind decodes per slot.
Companies are encouraged to complete the following table.
Aiming to finalize this at RAN1 #91.

| No. of PDCCH BDs per slot | SCS | | | |
| --- | --- | --- | --- | --- |
|  | 15 kHz | 30 kHz | 60 kHz | 120 kHz |
| Periodicity of 14 or more symbols | 44 | [22-44] | [11-44] | [6-44] |
| Periodicity of less than 14 symbols | [44-86] | [22-86] | [11-44] | [6-44] |

Agreements:
One set of the following parameters determines a set of search spaces
A set of aggregation levels
The number of PDCCH candidates for each aggregation level
PDCCH monitoring occasion for the set of search spaces
Agreements:
At least for cases other than initial access, to identify a set of search spaces, following parameters are configured by UE-specific RRC signaling:
The number of PDCCH candidates for each aggregation level of {1, 2, 4, 8, [16]}
One value from {0, 1, 2, 3, 4, 5, 6, 8}
PDCCH monitoring occasion for the set of search spaces
One value of from {1-slot, 2-slot, [5-slot], [10-slot], [20-slot]} (at least 5 values)
One or more value(s) from $1^{st}$ symbol, $2^{nd}$ symbol, ..., $14^{th}$ symbol within a monitored slot
Each set of search spaces associates with a CORESET configuration by RRC signaling
Agreements:
For PDCCH monitoring occasion of 1-slot, 2-slot, [5-slot], [10-slot], and [20-slot],
Slot-level offset value for PDCCH monitoring occasion is also supported.
For N-slot monitoring occasion, the offset is one from [0, N−1].
Note: symbol-level bit-map of monitoring occasion within a slot agreed at RAN1 #90bis is still available.
Agreements:
For the DMRS of NR-PDCCH in a CORESET,
The QCL configuration/indication is on a per CORESET basis.
Agreements:
The value(s) of TPC-PUSCH-RNTI, TPC-PUCCH-RNTI, and/or TPC-SRS-RNTI, are provided by RRC signaling.
The association between at least each of the following RNTIs and a DCI format is specified in the specification.
C-RNTI, TPC-PUSCH-RNTI, TPC-PUCCH-RNTI, TPC-SRS-RNTI, INT-RNTI, SFI-RNTI. FFS: other RNTI(s).
The value of C-RNTI is obtained as part of random access procedure.
The association between a DCI format and a type of search space (UE-common search space and UE-specific search space) is specified in the specification.
UE-common search space contains a DCI format of C-RNTI, RNTI(s) for SPS/grant-free, TPC-PUSCH-RNTI, TPC-PUCCH,RNTI, TPC-SRS-RNTI, and INT-RNTI.
UE-specific search space contains a DCI format of C-RNTI and RNTI(s) for SPS/grant-free.
As discussed in the Final Chairman's Note of 3GPP TSG RAN WG1 Meeting #91 (Reno, USA, 27 Nov.-1 Dec. 2017), blind decode attempts considering periodicity which is less than 14 OFDM symbols and equals or larger than 14 OFDM symbols are quoted below. In addition, a conclusion related to channel estimation is also quoted below. In addition, there are some agreements on beam management and beam failure recovery in RAN1 #91 meeting, as discussed in the Final Chairman's Note of 3GPP TSG RAN WG1 Meeting #91 (Reno, USA, 27 Nov.-1 Dec. 2017) as follows:
Agreements:
For information, the following cases are clarified:
Case 1: PDCCH monitoring periodicity of 14 or more symbols
Case 1-1: PDCCH monitoring on up to three OFDM symbols at the beginning of a slot
Case 1-2: PDCCH monitoring on any span of up to 3 consecutive OFDM symbols of a slot
For a given UE, all search space configurations are within the same span of 3 consecutive OFDM symbols in the slot
Case 2: PDCCH monitoring periodicity of less than 14 symbols
Note: this includes the PDCCH monitoring of up to three OFDM symbols at the beginning of a slot
The numbers in bracket in the following table can be further adjusted but not to be increased
X<=16, Y<=8
FFS whether or not to have case 2', where the values of X and/or Y can be smaller than case 2

| Max no. of PDCCH BDs per slot | SCS | | | |
|---|---|---|---|---|
| | 15 kHz | 30 kHz | 60 kHz | 120 kHz |
| Case 1-1 | 44 | 36 | 22 | 20 |
| Case 1-2 | [44] | | | — |
| Case 2 | [44 + X] | [36 + Y] | [22 + Y] | [20] |

Working assumption:
  For PDCCH monitoring for receiving RMSI, the number of PDCCH candidates are following:
    4 candidates for AL=4
    2 candidates for AL=8
  DCI size for RMSI scheduling and DCI size for OSI scheduling are the same
  FFS: Paging and fallback
Conclusion:
  RAN1 common understanding is that the PDCCH channel estimation complexity is not negligible at least in some cases.
  FFS: Possible solutions to resolve the channel estimation complexity issue together with the impact on PDCCH blocking probability
  Opt.1: Define the limits of "the number of CCEs for PDCCH channel estimation which refers to the union of the sets of CCEs for PDCCH candidates"
    Note: the overlapped CCEs associated with different CORESETs are counted separately.
    FFS: CCEs for the same precoder-granularity are counted as one channel estimation
    FFS: whether/how to handle the variation on the actual number of CCEs for PDCCH channel estimation and BDs over time
    Application of overbooking is considered
    Strive for not having specific UE capability to report the maximum number of CCEs for PDCCH channel estimation.
    Study the solutions considering the cases 1-1, 1-2, 2, and 2'.
  Opt.2: Modify the hashing function
  Opt.3: Increase the size of the precoder granularity
  [ . . . ]
Agreement

TABLE 1

Beam-failure-recovery-request-RACH-Resource configuration

| RRC parameter | Value range | Note/description |
|---|---|---|
| RootSequenceIndex-BFR | {0, 1, . . . , 137} | Short sequence only |
| ZeroCorrelationZoneConfig-BFR | {0, 1, . . . , 15} | Determine cyclic shift. Value range same as IA session |
| PreambleInitialReceivedTargetPower-BFR | FFS | Value range same as IA session |
| ra-PreambleIndexConfig-BFR | FFS | Value range same as IA session |
| PreambleTransMax-BFR | FFS | Value range same as IA session |
| powerRampingStep-BFR | FFS | |
| CandidateBeamThreshold | | One threshold for CSIRS |
| Candidate-Beam-RS-List | | A list of RS indices. The entry of each list can be a SSB index or a CSI-RS resource index |
| PRACH-resource-dedicated-BFR | | The following fields are defined for each candidate beam RS |
| Candidate-Beam-RS | {SSB index or CSI-RS ID} | RS index that is associated with the following PRACH resource Note: if the candidate-beam-RS-List includes both CSIRS resource indexes and SSB indexes, AND only SSB indexes are associated with PRACH resources, NR standard should specify a rule that the UE should Monitor both CSI-RS and SSB for New Beam Identification. |
| ra-PreambleIndex-BFR | FFS | Preamble index used to select one from a sequence pool |
| prach-FreqOffset-BFR | FFS | FDM'ed to other PRACH resources. Value range same as IA session |
| masks for RACH resources and/or SSBs | FFS | Time domain mask. Value range same as IA session |

TABLE 2

Other RRC parameters related to beam failure recovery

| RRC parameter (UE-specific parameters) | Value range | Note/description |
|---|---|---|
| ResponseWindowSize-BFR | FFS | Time duration for monitoring gNB response in Beam-Failure-Recovery-Response-CORESET after BFRQ. Similar to ra-ResponseWindowSize |
| Beam-failure-recovery-Timer | FFS | Details on UE behaviour related to the timer is FFS |
| NrOfBeamFailureInstance | FFS | Consecutive number of beam failure instances for declaring beam failure |
| Beam-Failure-Recovery-Response-CORESET | FFS | |

[ . . . ]
Agreement:
  For a UE, only periodic CSI-RS or SSB which is spatially QCL'ed with PDCCH DMRS is used for beam failure detection
    Support explicit configuration for the periodic CSI-RS for beam failure detection
      If this configuration is not made, the default mode is the following:
        UE expects at least one of periodic CSI-RS or SSB is spatially QCL'ed to PDCCH DMRS
Agreement:
  The measurement metric for candidate beam selection is L1-RSRP
    An RRC parameter is introduced to configure the threshold value for L1-RSRP based on CSI-RS
      Another threshold can be implicitly derived for L1-RSRP based on SSB
[ . . . ]
Agreement
  The BLER used for beam failure recovery reuses RLM default BLER threshold for RLM out-of-sync declaration
Agreement
  The starting point of the observation window of gNB response to beam failure recovery request transmission is 4 slots
[ . . . ]
Conclusion
  Draft LS to RAN2 to notify RAN2 impact of beam failure recovery with the following aspects (MediaTek)
    Mechanism for beam failure declaration
    Trigger condition beam failure recovery request transmission
    Non-contention PRACH resources are used for beam failure recovery request transmission
    Mechanism to decide successful/unsuccessful recovery from beam failure
[ . . . ]
  Agreements:
    If the Candidate-Beam-RS-List includes both CSI-RS resource indexes and SSB indexes, AND only SSB indexes are associated with PRACH resources,
    UE identifies PRACH resources for CSI-RS resource(s) in the Candidate-Beam-RS-List via spatial QCL indication between SSBs and CSI-RS resources, if UE-identified new beam(s) is associated with CSI-RS resource(s)
      UE sends BFRQ through a PRACH resource associated with the SSB, which is spatially QCLed with the CSI-RS resource.
    Note: in case the Candidate-Beam-RS-List includes both CSI-RS resource indexes and SSB indexes, AND only SSB indexes are associated with PRACH resources, a UE is not expected to be configured by Candidate-Beam-RS-List a CSI-RS resource which does not have a spatial QCL association with any of the SSB in the same Candidate-Beam-RS-List.
  Agreements: If there are multiple beams above the threshold for new beam identification, it is up to UE implementation to select a PRACH resource associated to the SSB/CSI-RS resource satisfying the threshold condition.
  Agreements: Upon receiving gNB response for beam failure recovery request transmission shall
    UE shall monitor CORESET-BFR for dedicated PDCCH reception until one of the following conditions is met:
      Reconfigured by gNB to another CORESET for receiving dedicated PDCCH and activated by MAC-CE a TCI state if the configured CORESET has K>1 configured TCI states
        FFS: if a default TCI state can be assumed for PDCCH after reconfiguration without MAC-CE activation
      Re-indicated by gNB to another TCI state(s) by MAC-CE of CORESET(s) before beam failure
    Until the reconfiguration/activation/re-indication of TCI state(s) for PDCCH, UE shall assume DMRS of PDSCH is spatial QCL'ed with DL RS of the UE-identified candidate beam in the beam failure recovery request
    After the reconfiguration/activation/re-indication of TCI state(s) for PDCCH, UE is not expected to receive a DCI in CORESET-BFR.
    Note: this applies to same carrier case.
[ . . . ]
  Agreement:
    Support to use RRC signalling to explicitly differentiate between SRS resources sets for beam management and SRS resource set for codebook/non-codebook based UL transmission;
    For SRS resources sets for UL beam management, only one resource in each of multiple SRS sets can be transmitted at a given time instant
      The SRS resources in different SRS resource sets can be transmitted simultaneously As discussed in the Final Chairman's Note of 3GPP TSG RAN WG1 Meeting # AH_1801 (Vancouver, Canada, 22-26 Jan. 2018), both maximum number of CORESET in a BWP and maximum number of search space in a BWP are quoted below. There is a working assumption related to channel estimation at least for monitoring periodicity equal to or larger than 14 OFDM symbols. In addition, there are some agreements on beam management and beam failure recovery in RAN1 # AH_1801 meeting, as described below in the Final Chairman's Note of 3GPP TSG RAN WG1 Meeting # AH_1801 (Vancouver, Canada, 22-26 Jan. 2018):
  Agreements:
    For a search space configuration, monitoring periodicity of slot(s) is updated as follows:
      For all SCS, {1, 2, 4, 5, 8, 10, 16, 20} slots
        For INT-RNTI, a subset of {1,2,4} slots is applied
      FFS: the case when concatenated semi-static DL/UL assignments is configured
  Working assumption:
    At least for case 1-1 and case 1-2, all UE supports channel estimation capability for 48 CCEs for a given slot per scheduled cell
      FFS: cross-carrier scheduling
      FFS: wideband RS
      FFS: overbooking and/or nested structure
      FFS: exceptional case of CCE counting
      FFS: for case 2
[ . . . ]
  Agreement:
    For beam failure detection model, PHY performs detection of beam failure instances, and indicates a flag to higher layer if a beam failure instance is detected
      FFS: When/Whether PHY needs to report candidate beam list and beam failure instance to MAC FFS: Whether non-beam failure instance is defined or is needed
Include as part of LS to RAN2
Agreement:
Change candidate beam selection model to the following alternatives:
  PHY performs L1-RSRP evaluation of each candidate new beam, provides to higher layer the subset of {beam RS index, L1-RSRP measurements} that satisfies the L1-RSRP threshold
    RAN 1 expects higher layer to perform new candidate beam selection based on the subset of {beam RS index, RSRP measurements}
  Note: The mapping between beam RS index(es) to PRACH resource(s)/sequence(s) is done in MAC
  Support for candidate beam selection model is specified in the RAN2 specifications
Agreement:
Behavior of Beam-failure-recovery-Timer
  Start Beam-failure-recovery-Timer upon beam failure detection event declared by UE
  Stop Beam-failure-recovery-Timer upon reception of gNB response for beam failure recovery request transmission
[ . . . ]
Agreement:
From RAN1_perspective, contention-free PRACH-based beam failure recovery is considered unsuccessful when one of the following conditions is met
  Upon expiry of Beam-failure-recovery-Timer
  Upon reaching max. # of BFRQ transmissions
[ . . . ]
Agreement:
Indication of beam failure instance to higher layer is periodic and indication interval is determined by the shortest periodicity of BFD RS $\bar{q}_0$, which is also lower bounded by [10] ms.
  Note: if the evaluation is below beam failure instance BLER threshold, there is no indication to higher layer.
  PHY provides to higher layer one or more sets of {beam RS index, L1-RSRP measurement} that satisfies the L1-RSRP threshold upon higher layer request.
As described in 3GPP R1-1801293, UE's behavior related to receive downlink control information is provided below. Section 6 of 3GPP R1-1801293, describes the procedures about beam failure recovery as follows:
6 Link Reconfiguration Procedures
A UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets that the UE is configured for monitoring PDCCH as described in Subclause 10.1 UE procedure for determining physical downlink control channel assignment.

The physical layer in the UE shall assess the radio link quality according to the set $\bar{q}_0$ of resource configurations against the threshold $Q_{out,LR}$ [10, TS 38.133]. The thresholds $Q_{out,LR}$ and $Q_{in,LR}$ correspond to the default value of higher layer parameter RLM-IS-OOS-thresholdConfig and Beam-failure-candidate-beam-threshold, respectively. For the set $\bar{q}_0$, the UE shall assess the radio link quality only according to periodic CSI-RS resource configurations or SS/PBCH blocks that are quasi co-located, as described in [6, TS 38.214], with the DM-RS of PDCCH receptions DM-RS monitored by the UE. The UE applies the configured $Q_{out,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

The physical layer in the UE shall, in slots where the radio link quality according to the set $\bar{q}_0$ is assessed, provide an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum of the shortest periodicity of periodic CSI-RS configurations or SS/PBCH blocks in the set $\bar{q}_0$ and X.

The UE shall provide to higher layers information identifying the periodic CSI-RS configuration indexes or SS/PBCH block indexes from the set $\bar{q}_1$ and the corresponding measurements having radio link quality that is larger than or equal to $Q_{in,LR}$.

A UE is configured with one control resource set by higher layer parameter Beam-failure-Recovery-Response-CORESET. The UE may receive from higher layers, by parameter Beam-failure-recovery-request-RACH-Resource, a configuration for a PRACH transmission as described in Subclause 8.1. After 4 slots from the slot of the PRACH transmission and according to an antenna port quasi co-location associated with periodic CSI-RS configuration or SS/PBCH block with index $\bar{q}_{new}$ in set $\bar{q}_1$ the UE monitors PDCCH for detection of a DCI format 1_0 or a DCI format 1_1 with CRC scrambled by C-RNTI within a window configured by higher layer parameter Beam-failure-recovery-request-window, and in the control resource set configured by higher layer parameter Beam-failure-Recovery-Response-CORESET. The UE determines the index $q_{new}$ based on a mapping between the PRACH preamble index and the SS/PBCH block index provided by higher layer parameter SSB-PRACH-CFRA-association or based on a mapping between the PRACH preamble index and a periodic CSI-RS configuration index provided by higher layer parameter CSI-RS-PRACH-association.

UE Procedure for Receiving Control Information
[ . . . ]
A UE shall monitor a set of PDCCH candidates in one or more control resource sets on the active DL BWP on each activated serving cell according to corresponding search spaces where monitoring implies decoding each PDCCH candidate according to the monitored DCI formats.
[ . . . ]
If a carrier aggregation capability for a UE, as included in UE-NR-Capability, is larger than 4, the UE includes in UE-NR-Capability an indication for a maximum number of PDCCH candidates the UE can monitor per slot when the UE is configured for carrier aggregation operation over more than 4 cells. When the UE is configured for carrier aggregation operation over more than 4 cells, the UE is not expected to be configured with a number of PDCCH candidates to monitor per slot that is larger than the maximum number.

10.1 UE Procedure for Determining Physical Downlink Control Channel Assignment A set of PDCCH candidates for a UE to monitor is defined in terms of PDCCH search spaces. A search space can be a common search space or a UE-specific search space. A UE shall monitor PDCCH candidates in non-DRX slots in one or more of the following search spaces

- a Type0-PDCCH common search space for a DCI format with CRC scrambled by a SI-RNTI on a primary cell;
- a Type0A-PDCCH common search space for a DCI format with CRC scrambled by a SI-RNTI on a primary cell;
- a Type1-PDCCH common search space for a DCI format with CRC scrambled by a RA-RNTI, or a TC-RNTI, or a C-RNTI on a primary cell;
- a Type2-PDCCH common search space for a DCI format with CRC scrambled by a P-RNTI on a primary cell;
- a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s), or TC-RNTI, or SP-CSI-RNTI; and
- a UE-specific search space for a DCI format with CRC scrambled by C-RNTI, or CS-RNTI(s), or TC-RNTI, or SP-CSI-RNTI.

A UE is provided a configuration for a control resource set for Type0-PDCCH common search space by higher layer parameter RMSI-PDCCH-Config and a subcarrier spacing by higher layer parameter RMSI-scs for PDCCH reception. The UE determines the control resource set and the monitoring occasions for Type0-PDCCH common search space as described in Subclause 13. The Type0-PDCCH common search space is defined by the CCE aggregation levels and the number of candidates per CCE aggregation level given in Table 10.1-1. The control resource set configured for Type0-PDCCH common search space has control resource set index 0. The Type0-PDCCH common search space has search space index 0.

[ . . . ]

For Type1-PDCCH common search space, a UE is provided a configuration for a control resource set by higher layer parameter rach-coreset-configuration and a configuration for a search space by higher layer parameter ra-SearchSpace. If higher layer parameter rach-coreset-configuration is not provided to the UE, the control resource set for Type1-PDCCH common search space is the same as for Type0-PDCCH common search space.

[ . . . ]

The UE may assume that the DM-RS antenna port associated with PDCCH reception in the Type0-PDCCH common search space and the Type2-PDCCH common search space, and for corresponding PDSCH receptions, and the DM-RS antenna port associated with SS/PBCH reception are quasi co-located with respect to delay spread, Doppler spread, Doppler shift, average delay, and spatial Rx parameters. The value for the DM-RS scrambling sequence initialization is the cell ID.

The subcarrier spacing and the CP length for PDCCH reception with Type0A-PDCCH common search space, or Type1-PDCCH common search space, or Type2-PDCCH common search space are the same as for PDCCH reception with Type0-PDCCH common search space.

A UE may assume that the DM-RS antenna port associated with PDCCH reception in the Type0A-PDCCH common search space and associated PDSCH are quasi co-located with the SS/PBCH block with respect to delay spread, Doppler spread, Doppler shift, average delay, and spatial Rx parameters, when applicable.

A UE may assume that the DM-RS antenna port associated with PDCCH reception and associated PDSCH reception in the Type1-PDCCH common search space are quasi co-located with the SS/PBCH block identified in initial access procedure with respect to delay spread, Doppler spread, Doppler shift, average delay, and spatial Rx parameters, when applicable.

If a value for the DM-RS scrambling sequence initialization for Type0A-PDCCH common search space, or Type1-PDCCH common search space, or Type2-PDCCH common search space is not provided by higher layer parameter PDCCH-DMRS-Scrambling-ID in SystemInformationBlockType1, the value is the cell ID.

If a UE is configured for downlink bandwidth part (BWP) operation, as described in Subclause 12, the above configurations for the common search spaces apply for the initial active DL BWP. The UE can be additionally configured a control resource set for Type0-PDCCH common search space, Type0A-PDCCH common search space, Type1-PDCCH common search space, or Type2-PDCCH common search space for each configured DL BWP on the primary cell, other than the initial active DL BWP, as described in Subclause 12.

[Table 10.1-1 of 3GPP R1 1801293, entitled "CCE aggregation levels and number of candidates per CCE aggregation level for Type0/Type0A/Type2-PDCCH common search space", is reproduced as FIG. 5]

For each DL BWP configured to a UE in a serving cell, a UE can be provided by higher layer signalling with P control resource sets where P 3. For control resource set p, 0≤p<P where a UE-specific search space, a Type2-PDCCH common search space, or a Type3-PDCCH common search space is mapped, the higher layer signalling provides:

- a control resource set index by higher layer parameter CORESET-ID;
- a DM-RS scrambling sequence initialization value by higher layer parameter PDCCH-DMRS-Scrambling-ID;
- a number of consecutive symbols provided by higher layer parameter CORESET-time-duration;
- a set of resource blocks provided by higher layer parameter CORESET-freq-dom;
- a CCE-to-REG mapping provided by higher layer parameter CORESET-CCE-to-REG-mapping-type;
- a REG bundle size, in case of interleaved CCE-to-REG mapping, provided by higher layer parameter CORESET-REG-bundle-size;
- a cyclic shift for the REG bundle interleaver [4, 38.211] by higher layer parameter CORESET-shift-index;
- an antenna port quasi co-location, from a set of antenna port quasi co-locations provided by higher layer parameter TCI-StatesPDCCH, indicating quasi co-location information of the DM-RS antenna port for PDCCH reception;
- an indication for a presence or absence of a transmission configuration indication (TCI) field for DCI format 1_0 or DCI format 1_1 transmitted by a PDCCH in control resource set p, by higher layer parameter TCI-PresentInDCI.

[ . . . ]

If a UE has received higher layer parameter TCI-StatesPDCCH containing more than one TCI states but not MAC CE activation for one of the TCI states, the UE assumes that the DM-RS antenna port associated with PDCCH reception in the UE-specific search space is quasi co-located with the SS/PBCH block the UE identified during the initial access procedure with respect to delay spread, Doppler spread, Doppler shift, average delay, and spatial Rx parameters, when applicable.

If a UE has received higher layer parameter TCI-StatesP-DCCH containing a single TCI state, the UE assumes that the DM-RS antenna port associated with PDCCH reception in a UE-specific search space is quasi co-located with the one or more DL RS configured by the TCI state.

For each DL BWP of a serving cell where a UE is configured to monitor PDCCH in a search space other than Type0-PDCCH common search space, the UE is configured the following by higher layer parameter search-space-config:

- an association between a search space set index s, 0≤s<S, where s≤10, and a control resource set index p;
- for the search space set s in the control resource set p:
    - an indication that the search space set is a common search space set or a UE-specific search space set by higher layer parameter Common-search-space-flag;
    - if the search space is a common search space, an indication by higher layer parameter RNTI-monitoring to monitor PDCCH in the search space for one or more of DCI format 0_0 and DCI format 1_0, DCI format 2_0, DCI format 2_1, DCI format 2_2, and DCI format 2_3;
    - if the search space is a UE-specific search space, an indication by higher layer parameter USS-DCI-format to monitor PDCCH in the search space either for DCI format 0_0 and DCI format 1_0, or for DCI format 0_1 and DCI format 1_1;
    - a number of PDCCH candidates $M_{p,s}^{(L)}$ per CCE aggregation level L by higher layer parameters Aggregation-level-1, Aggregation-level-2, Aggregation-level-4, Aggregation-level-8, and Aggregation-level-16, for CCE aggregation level 1, CCE aggregation level 2, CCE aggregation level 4, CCE aggregation level 8, and CCE aggregation level 16, respectively;
    - a PDCCH monitoring periodicity of $k_{p,s}$ slots by higher layer parameter Monitoring-periodicity-PDCCH-slot;
    - a PDCCH monitoring offset of $o_{p,s}$ slots, where $0 \le o_{p,s} < k_{p,s}$, by higher layer parameter Monitoring-offset-PDCCH-slot;
    - a PDCCH monitoring pattern within a slot, indicating first symbol(s) of the control resource set within a slot for PDCCH monitoring, by higher layer parameter Monitoring-symbols-PDCCH-within-slot.

A UE determines a PDCCH monitoring occasion from the PDCCH monitoring periodicity, the PDCCH monitoring offset, and the PDCCH monitoring pattern within a slot.

A PDCCH UE-specific search space $S_{k_{p,s}}^{(L)}$ at CCE aggregation level L∈{1,2,4,8,16} is defined by a set of PDCCH candidates for CCE aggregation level L.

As described in 3GPP R1-1800372, there are some proposals related to channel estimation reduction and blind decode reduction as follows:

1. Discussions 1.1. Channel Estimation Complexity

In LTE PDCCH, a channel estimation is performed using CRS, so a wideband channel estimation on CRS can be done and there is no need to perform channel estimation to each CCE. On the other hand, in NR, DMRS and REG bundle are used for channel estimation, and the number of channel estimation is increased dramatically compared to LTE PDCCH. In conclusion, the UE may not perform channel estimation in time on some cases.

There are three options for resolving channel estimation complexity issue.

Option 1) the Limited Number of Channel Estimation

In option 1, it was proposed that the number of CCEs for PDCCH channel estimation which refers to the union of the sets of CCEs for PDCCH candidates is limited to "Y". (Exact value of Y is FFS.) For this option, followings should be considered;

CCE Counting Rule

For candidates in a same CORESET, same properties (such as CCE-to-REG mapping, REG bundle size, precoder granularity, RS scrambling parameter, QCL, and REG & CCE indexing) are applied. So, the overlapped CCE among different candidates in a CORESET can be counted as one channel estimation. On the other hand, it is desirable that the overlapped CCEs between different CORESETs are counted separately even if same precoder granularity is applied, because associated CORESETs might have own CORESET configuration. For example, each CORSET has an own DMRS scrambling sequence initialization value, a UE should set the parameter based on a CORESET configuration.

In addition, the REG bundle size of a CORESET could be considered for counting CCEs. The MMSE channel estimation is general approach for a PDCCH decoding in NR, and matrix sizes for an MMSE algorithm depend on REG bundle size of a CORESET. It means that the number of multiplications could be increased dramatically when a large REG bundle size is used.

The MMSE channel estimation can be described as follows;

$$\hat{H} = R_{\hat{H}\tilde{H}} R_{\tilde{H}\tilde{H}}^{-1} \tilde{H}$$

where $R_{\tilde{H}\tilde{H}}$ is the autocorrelation of $\tilde{H}$, $R_{\hat{H}\tilde{H}}$ is the cross-correlation matrix between the true channel vector and temporary channel estimate vector.

A simple comparison among bundle sizes is as follows; (In this comparison, complexity for deriving matrix $R_{\tilde{H}\tilde{H}}$ and $R_{\tilde{H}\tilde{H}}^{-1}$ is not considered. The number of multiplications is calculated per CCE.)

[Table 1 of 3GPP R1-1800372, entitled "The number of multiplications for channel estimation", is reproduced as FIG. 6]

As shown in the table, the number of multiplications for channel estimations of a CCE is increased exponentially as the REG bundle size is increased. So, it is desirable that the REG bundle size of a CORESET should be reflected to count CCEs. For example, each REG bundle size can have a weight factor for counting CCE.

Candidate Dropping Rule

If the number of CCEs derived by the counting rule is larger than a limit for resolving channel estimation complexity issue, a UE should determine which candidates are skipped on configured blind decodings. A straightforward way is to give priority to a resource unit such as CORESET, search space, or candidate. A UE can perform blind decoding on candidates which has higher priority first. The priority can be determined considering CORESET configuration, search space type and/or aggregation level. For example, candidates included in CSS and/or GC CSS can have high priority.

On the other hand, it can be also considered that there is a maximum channel estimation complexity that a UE supports per each numerology similar to blind decoding capability where the network ensures configuration would not exceed the UE capability. For both blind decoding and channel estimation, this can be inefficient as the network has to ensure configuration does not exceed UE capability in the worst case. For example, if multiple candidates share the same REG bundles, the overall channel estimations can be reduced. However, if it is ensured by configuration only, the network has to assume the worst case (e.g., no overlap between candidates) to estimate the channel estimation complexity as the overlapping among candidates can change over time depending on hashing function. Thus, it is desirable to allow configuration may exceed UE's capability and then consider priority rules to drop. The same rules can be applied to both BD and channel estimation capabilities.
Option 2) the Modification of Hashing Function From our perspective, option 2 means a nested structure. The nested structure is useful for decreasing channel estimation complexity, because a channel estimation of low aggregation level candidate can be reused for a high aggregation level candidate. However, since multiple CORESETs can be monitored in a same slot, option 1 may be still needed to control channel estimation complexity.
Option 3) Higher Precoder Granularity In our understanding, higher precoder granularity (e.g., inter-CCE bundling) cannot decrease channel estimation complexity as shown in Table 1. So, this option could be excluded.

Proposal 1: The limitation of channel estimated CCEs is preferred for resolving channel estimation complexity issue.

Proposal 2: The CCE counting rule should be needed.
  The overlapped CCE between different candidates in a CORESET is counted as one channel estimation.
  The overlapped CCE between different candidates included in different CORESETs is counted separately.
  Different weight for each REG bundle size can be considered for CCE counting
    One CCE is considered as one for channel estimated CCE if REG bundle size is 2 or 3
    One CCE is considered as two for channel estimated CCE if REG bundle size is 6

Proposal 3: A UE is expected to be configured with search space configurations which may lead larger number of channel estimated CCEs than the UE supports.
  The UE is not required to perform monitoring beyond its BD capability and channel estimation capability
  The UE can skip monitoring on candidates based on the priority rule
  Priority rule is determined between
    Priority can be given based on CORESET index
    Priority can be given based on AL from the highest AL to the lowest AL
      FFS whether to give highest priority on the AL used in the most recent DCI 1.2. BD Capability In LTE, UE's BD capability is hard-split between CSS and USS where BDs cannot be used for USS even if the UE does not monitor CSS in a subframe. In NR, so far, the maximum BD capability is agreed in a slot for slot/non-slot based scheduling. As it does not matter whether CSS or USS from BD perspective, it is generally desirable to allow flexibility to share BD capabilities across different SSs as long as the total BDs do not exceed UE capability.

It is however notable that as search space set is configured with periodicity, depending on the configuration, it sometimes is difficult to fully utilize BD capability in all slots. For example, if CSS with 20 candidates is configured in every 5slot with offset 0, and USS is configured in every slot, the maximum number of candidates allocable to USS would be 24 if the UE capability is 44. This can be addressed by two approaches. First approach is to allow more flexible configuration such as periodicity and multiple occasions within that period. For example, to address the above case, one USS is configured in every slot with 24 candidates, and another USS with 5 slots with bitmap of [0 1 1 1 1] (i.e., no USS monitoring in first slot in every 5 slots) with 20 candidates can be configured. This can be also addressed by configuring different set of ALs/Candidates per each SS on different subset of slots. For example, 24 candidates are configured in slot 0, 5, 10, etc., and 44 candidates are configured in other slots. Another approach is to allow configuration may exceed UE capability even for BD. Then, a UE can skip monitoring on certain candidates depending on the priority. Either way, particularly for small number of UE BD capabilities (e.g., with 120 kHz SCS), more efficient means of utilizing all the capability seems necessary.

Proposal 4: Support flexible BD sharing among multiple search space set configurations. Consider either enhancing search space set configuration or allowing configuration exceeding UE capability.
  If search space set configuration is enhanced, consider more flexible periodicity configuration
  If configuration exceeding UE capability is allowed, the same priority rule to skip monitoring on certain candidates is used between BD and channel estimation.

3GPP R1-1800550 includes some observations and proposals related to blind decodes and channel estimations as follows:

Conclusions

In this contribution, we have discussed remaining details of search space design for NR-PDCCH. Based on the discussion, we make the following observations and proposals:

Observation #1: When a gNB serves multiple services with different PDCCH monitoring periodicity, the infrequent monitoring peaks may occur. The gNB should be allowed to over-book BDs during these infrequent peaks, to avoid BD restrictions in other monitoring occasions.

Observation #2: If CCE overbooking would not be allowed and CCE limitation would be set to 48 CCE, gNB would not be able to configure single CSS (0, 0, 4, 2, 0) and single USS (6, 6, 2, 2, 0) in a CORESETs larger than 48CCE.

Observation #3: The proposed hashing function is a refinement of the hashing function of LTE EPDCCH.

Observation #4: For typical CORESET sizes, the proposed hashing function outperforms the hashing function of LTE EPDCCH by about one-two orders of magnitude in blocking probability.

Observation #5: For a targeted PDCCH blocking probability, the proposed hashing function allows to reduce the CORESET size by about 40% as compared to using the hashing function of LTE EPDCCH.

Observation #6: For a targeted PDCCH blocking probability, the proposed hashing function allows to reduce the number of blind decodes per USS per slot by about 50% and the number of channel estimates per USS per slot by about 30% as compared to using the hashing function of LTE EPDCCH.

Proposal #1: NR supports search-space-set configurations that may result in over-booking BDs and CCEs in a slot.
  FFS: How to reduce the PDCCH BDs down to the allowed level for over-booked monitoring occasions.

Proposal #2: BD dropping in a serving cell is based on the predefined rules and it should not introduce additional RRC signaling.

Proposal #3: BD dropping in a serving cell is applied only for UE-specific search space sets Proposal #4: BD dropping in a serving cell is based on predefined BD priority number $\rho_{BD}(s,L,m)=m/M_z^{(L)}$.

Proposal #5: When there is a need for BD dropping in a slot, PDCCH candidates to be dropped are defined according to the smallest $\rho_{BD}(s,L,m)$ within all the involved search space sets subject to BD dropping. If multiple PDCCH candidates have the same priority, dropping order is defined according to the predefined priorities:

PDCCH candidate with a lowest AL L is dropped first

PDCCH candidate with a lowest search space set priority is dropped first. Search space set priority is derived implicitly from the search space set ID s.

Proposal #6: If CCE reduction scheme is defined according to Opti, strive for a common solution for BD reduction and CCE reduction.

Proposal #7: In the proposed CCE reduction scheme, UE drops one PDCCH candidate after another according to the BD priority number, until the CCE cap is reached. If CCEs of selected candidate is dropped, also other candidates fully or partially overlapping with the CCE(s) are dropped.

Proposal #8: Consider a rule where predefined CCEs such as CCEs belonging to TYPE0 and TYPE0A are never dropped.

Proposal #9: In the cases when the need for CCE reduction exists at the same time with the need for BD reduction, perform BD reduction first.

Proposal #10: To reduce the number of needed PDCCH candidates, size of needed CORESET, number of needed overall CCEs to achieve given blocking probability, adopt the hash function for NR-PDCCH given by equation (1).

In addition to observations and proposals, we have two text proposals to capture the proposals in TS 38.213 (see Section 2).

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

Qualified beam: A qualified beam is a beam with radio quality, based on measuring signal on the beam, better than a threshold.

The best serving beam: The serving beam with the best quality (e.g. the highest BRSRP value).

The worst serving beam: The serving beam with the worst quality (e.g. the worst BRSRP value).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request(SR), channel state information(CSI), HARQ-ACK/NACK for downlink transmission Slot: A scheduling unit in NR. Slot duration is 14 OFDM symbols.

Mini-slot: A scheduling unit with duration less than 14 OFDM symbols.

DL common signal: Data channel carrying common information that targets for multiple UEs in a cell or all UEs in a cell. Example of DL common signal could be system information, paging, RAR.

One or multiple of following assumptions for network side may be used hereafter:

NR using beamforming could be standalone, i.e. UE can directly camp on or connect to NR.

NR using beamforming and NR not using beamforming could coexist, e.g. in different cells.

TRP would apply beamforming to both data and control signaling transmissions and receptions, if possible and beneficial.

Number of beams generated concurrently by TRP depends on TRP capability, e.g. maximum number of beams generated concurrently by different TRPs may be different.

Beam sweeping is necessary, e.g. for the control signaling to be provided in every direction.

(For hybrid beamforming) TRP may not support all beam combinations, e.g. some beams could not be generated concurrently. FIG. 18 shows an example for combination limitation of beam generation.

Downlink timing of TRPs in the same cell are synchronized.

RRC layer of network side is in BS.

TRP should support both UEs with UE beamforming and UEs without UE beamforming, e.g. due to different UE capabilities or UE releases.

One or multiple of following assumptions for UE side may be used hereafter:

UE may perform beamforming for reception and/or transmission, if possible and beneficial.

Number of beams generated concurrently by UE depends on UE capability, e.g. generating more than one beam is possible.

Beam(s) generated by UE is wider than beam(s) generated by TRP, gNB, or eNB.

Beam sweeping for transmission and/or reception is generally not necessary for user data but may be necessary for other signaling, e.g. to perform measurement.

(For hybrid beamforming) UE may not support all beam combinations, e.g. some beams could not be generated concurrently. FIG. 13 shows an example of combination limitation of beam generation.

Not every UE supports UE beamforming, e.g. due to UE capability or UE beamforming is not supported in NR first (few) release(s).

One UE is possible to generate multiple UE beams concurrently and to be served by multiple serving beams from one or multiple TRPs of the same cell.

Same or different (DL or UL) data could be transmitted on the same radio resource via different beams for diversity or throughput gain.

There are at least two UE (RRC) states: connected state (or called active state) and non-connected state (or called inactive state or idle state). Inactive state may be an additional state or belong to connected state or non-connected state.

Figure 7:
FIG. 7 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 7 (a reproduction of FIG. 3 of 3GPP R2-162251) illustrates gain compensation by beamforming.

Figure 8:
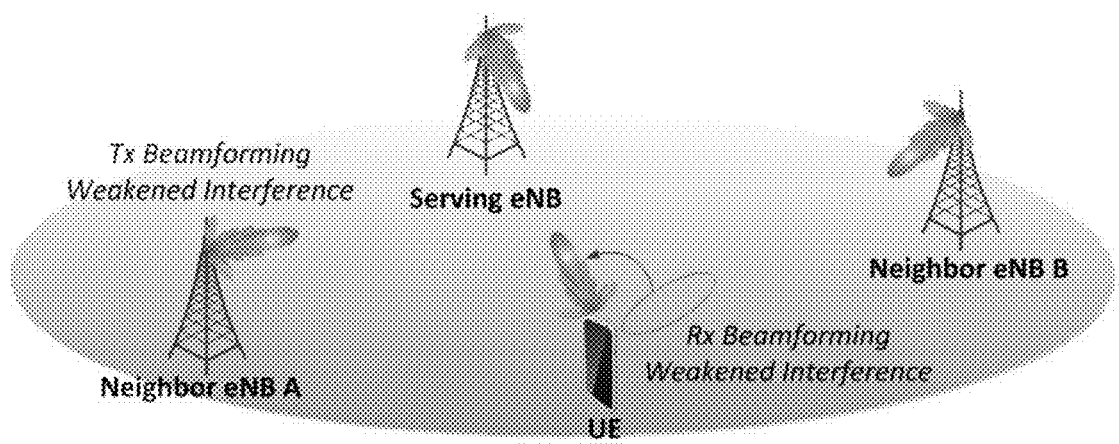
FIG. 8 is a reproduction of FIG. 4 of 3GPP R2-162251.

From the SINR perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 8 (a reproduction of FIG. 4 of 3GPP R2-162251) illustrates a weakened interference by beamforming.

In wireless communication system, multiple PDCCH (Physical Downlink Control Channel) candidates are important for UE to reduce PDCCH block probability. In 5G NR, transmission in high frequency band (i.e. from 6 GHz to 52.6 GHz) is attractive for people due to wider bandwidth of high frequency. However, there are some impacts resulted from transmission through high frequency band, e.g. transmitted power will decay dramatically. Hence, more and more researches suggest that transmitters or receivers are implemented with beam(s) which is a signal processing technique about allocating power toward a specific direction. A network operating in high frequency band may have multiple beams to support entire coverage. Due to introduction of beam, UE needs to be configured with beam-specific reference and/or UE-specific reference signal other than cell-specific reference signal to decode channel with beam(s). Currently, NE introduces a TCI state framework for UE to derive QCL indication for at least receiving downlink transmission. A TCI state is indicated in a scheduling DCI and is associated with a reference signal and a QCL type. With the assistance of the TCI state in the scheduling DCI, the UE can use a receiving beam to receive the scheduled downlink data (i.e. PDSCH) as to use the receiving beam to receive the reference signal.

When beam failure is detected by UE, UE may trigger a beam failure recovery (BFR) procedure. After 4 slots from UE transmitting a preamble, which is associated with a candidate beam decided by UE, UE may monitor and/or receive and/or demodulate a gNB response (or BFR response) on a dedicated BFR CORESET via the candidate beam. UE monitors/receives this gNB response within a beam failure recovery window (also can be called gNB response window). The gNB response (or BFR response) can be a C-RNTI scrambled PDCCH.

Since the UE does not receive (re)configuration about CORESET(s) when monitoring gNB response, the UE may also monitor the CORESET(s) corresponding to previous configuration for normal data reception (i.e. via a previous set of reference signal (or TCI state or beam) to receive and/or monitor and/or demodulate the CORESET(s)). However, monitoring the BFR dedicated CORESET plus previous CORESETs may incur excessive channel estimation attempts due to a great number of control channel elements (CCE) and/or blind decode attempts resulted from additional PDCCH candidate(s) and/or monitoring occasion(s).

Figure 9:
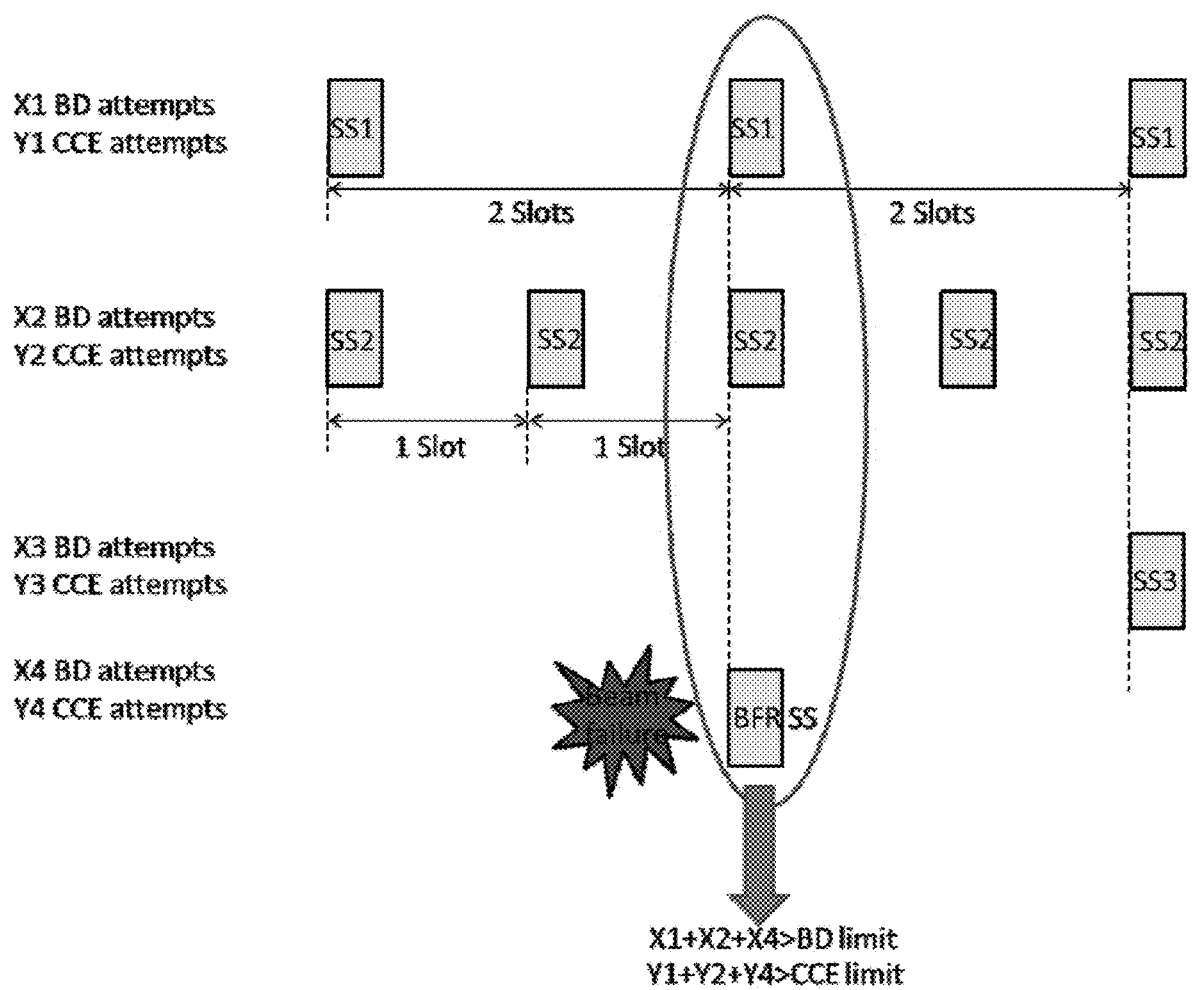
FIG. 9 is a diagram according to one exemplary embodiment.

As shown in FIG. 9, assuming a UE is configured with search spaces SS1, SS2, SS3, BFR SS in an active downlink BWP (bandwidth part), wherein the UE monitors SS1 every 2 slots and monitors SS2 every 1 slot and monitors SS3 every 8 slots. The UE is configured to perform X1 blind decode attempts and Y1 CCE for channel estimation attempts for monitoring PDCCH candidates in SS1. Similarly, X2 blind decode attempts and Y2 CCE for channel estimation attempts for SS2, X3 blind decode attempts and Y3 CCE for channel estimation attempts for SS3, and X4 blind decode attempts and Y4 CCE for channel estimation attempts for BFR SS. In this example, if the UE detects beam failure, the UE transmits a signal and monitors gNB response in BFR SS. However, BD attempts and/or CCE attempts exceeds the maximum due to taking into account BD attempts and CCE attempts of BFR SS. If the UE de-prioritizes the BFR SS, the UE could not receive the gNB response in BFR SS for sooner recovering beam failure. Based on discussion from 3GPP R1-1800372 and R1-1800550, if a UE cannot afford these excessive attempts, the UE may prioritize CORESET(s) associated with common search space among monitored CORESET(s). Accordingly, the UE could not receive the gNB response in the dedicated CORESET.

In one embodiment, a general concept of this invention is that CORESET(s) configured for receiving BFR response during beam failure recovery (at least within the BFR window) is prioritized when, within a time duration, the number of channel estimation exceeds a first maximum number and/or the number of blind decode exceeds a second maximum number. The first maximum number can be related to the capability of channel estimation within a time duration. The first maximum number can be maximum control channel element (CCE) number UE can process, receive, monitor, or decode within a time duration. In one embodiment, the first maximum number can be 48 CCEs. The time duration may be a slot or smaller than a slot.

In one embodiment, the second maximum number can be related to the capability of blind decoding within a time duration. The second maximum number can be maximum PDCCH candidate(s) UE can blindly decode within the time duration. A PDCCH candidate can be determined at least based on or be at least related to a CCE aggregation level and/or a payload size. The time duration may be a slot or smaller than a slot.

In one embodiment, a UE can be configured with at least a bandwidth part (BWP). The UE can be configured with at most N CORESETs in a BWP. In one embodiment, N can be 3.

In one embodiment, the UE can be configured with a dedicated CORESET. The dedicated CORESET can be used for a link reconfiguration procedure, e.g. beam failure recovery. The dedicated CORESET can be per carrier or per BWP. The UE could receive or monitor BFR response on the dedicated CORESET. More specifically, the UE may not expect to receive downlink transmission, e.g. PDSCH (Physical Downlink Shared Channel)(, PDCCH, in the dedicated CORESET if the UE is not performing a link reconfiguration procedure, e.g. BFR procedure. More specifically, there may at least one CORESET reserved for the dedicated CORESET per BWP.

In one embodiment, the dedicated CORESET may be one of the N CORESETS in a BWP. The dedicated CORESET may not be one of the N CORESETS in a BWP. More specifically, the UE is configured with N+1 CORESETs in a BWP.

In one embodiment, the UE may monitor, receive, and/or demodulate CORESETs excluding the dedicated CORESET in a BWP if the UE is not performing beam failure recovery. If the number of consecutive detected beam failure instances exceeds a third number, the UE can trigger a beam failure recovery procedure. The third number can be configured by network. More specifically, the UE can transmit a preamble which is dedicated and associated to a reference signal transmitted via a candidate beam. More specifically, the preamble can be transmitted on contention-based PRACH. Alternatively, the preamble can be transmitted on contention-free PRACH.

In one embodiment, the UE may monitor, receive, and/or demodulate a control signal in the dedicated CORESET. The control signal can be a response for the preamble. More specifically, the reference signal may be SS/PBCH block and/or CSI-RS. More specifically, the UE may monitor, receive, and/or demodulate the control signal in the dedicated CORESET transmitted via the candidate beam.

In one embodiment, the UE may monitor, receive, and/or demodulate the control signal in the dedicated CORESET 4 slots after the UE transmits the preamble. The control signal can be a PDCCH scrambled by C-RNTI. The UE may monitor, receive, and/or demodulate the control signal in the dedicated CORESET in an active BWP while monitoring, receiving, and/or demodulating CORESET(s) in the active BWP.

In one embodiment, if the number of channel estimation exceeds the first maximum number and/or the number of blind decodes exceeds the second maximum number, the UE prioritizes to monitor, receive, and/or demodulate the control signal in the dedicated CORESET. The UE ignores a first set of control channel elements (CCE). The UE may skip monitoring, receiving, and/or demodulating the first set of CCEs. The UE may not receive, monitor, and/or demodulate the first set. The UE may not receive, monitor, and/or demodulate the first set to reduce the number of channel estimation and make the number of channel estimation smaller than or equal to the first maximum number.

In one embodiment, the CCE(s) in the first set may be determined based on whether if ignoring or not receiving, monitoring, and/or demodulating the CCE(s) can meet the capability of channel estimation. The UE is not expected to ignore CCE(s) in the dedicated CORESET. The UE may ignore some CCE(s) in the dedicated CORESET if the number of channel estimation exceeds the first maximum number even when all CCE(s) in CORESET(s) excluding the dedicated CORESET in an activated BWP are ignored.

In one embodiment, the CCE(s) in the first set may be configured by a network. The CCE(s) in the first set may be CCE(s) which is not overlapped with the dedicated CORESET. The CCE(s) in the first set may be all CCE(s) (or some of CCEs) belonging to a CORESET with a smaller or larger CORESET index in an activated BWP. Alternatively, the CCE(s) in the first set may be all CCE(s) (or some of CCEs) belonging to a CORESET in an activated BWP, which is not the dedicated CORESET. The CCE(s) in the first set may also be all CCE(s) (or some of CCEs) belonging to a CORESET and all CCE(s) or some of CCE(s) in the dedicated CORESET in an activated BWP.

In one embodiment, the CCE(s) in the first set may be CCE(s) belonging to a CORESET excluding the dedicated CORESET, wherein the CORESET may occupy the most resource element(s) and/or may have the most monitoring occasion(s) in a slot among all CORESETs required to receive/monitor in the slot. More specifically, monitoring occasion(s) of a CORESET in a slot can be configured via a bit-map, wherein value of 1 in the bit-map indicates a starting OFDM symbol of a monitoring occasion of the CORESET in a slot.

In one embodiment, the CCE(s) in the first set may be CCE(s) belonging to a CORESET excluding the dedicated CORESET, wherein the CORESET may have the least channel estimation attempts and/or may have smaller REG bundle size and/or may have narrower channel bandwidth among all CORESETs required to receive/monitor in a slot with a monitoring occasion. Preferably, REG bundle size can be configured as 2, 3, or 6.

In one embodiment, the UE may ignore a second set of CORESET(s) in an active BWP. More specifically, the second set in an active BWP may exclude the dedicated CORESET. Alternatively, the second set in an active BWP may include the dedicated CORESET.

In one embodiment, the UE may not receive, monitor, and/or demodulate the second set. In particular, the UE may not receive, monitor, and/or demodulate the second set to reduce the number of channel estimation smaller than or equal to the first maximum number. The number of CORESETs in the second set may be 1 or 2 or 3 or 4. The UE may skip monitoring, receiving, and/or demodulating CORESET(s) in the second set. The CORESET(s) in the second set may be determined based on whether if ignoring or not receiving, monitoring, and/or demodulating the CORESET(s) can meet the first maximum number. The UE is not expected to ignore the dedicated CROESET.

In one embodiment, CORESET(s) in the second set may be determined based on the lowest or highest CORESET index among all CORESETs configured in the activated BWP. In particular, CORESET(s) in the second set may be determined based on the top lowest or highest CORESET index among all CORESETs configured in the activated BWP. If the number of channel estimation exceeds the first maximum number when the second set comprises a CORESET with the lowest or highest CORESET index among all CORESETs configured in the activated BWP, the second set may comprise a CORESET with second lowest or second highest CORESET index among all CORESETs configured in the activated BWP.

For example, a UE is configured with three CORESET(s) in the same slot in an active BWP, wherein the three CORESETs are indexed as 3, 4, and 5 respectively and the CORESET indexed as 5 is the dedicated CORESET. If the number of channel estimation exceeds the first maximum number, the UE may ignore the CORESET indexed 3. If the number of channel estimation still exceeds the first maximum number by ignoring the CORESET indexed as 3, the UE may further ignore the CORRSET indexed as 4.

As another example, a UE is configured with three CORESET(s) in the same slot in an active BWP, wherein the three CORESETs are indexed as 3, 4, and 5 respectively and the CORESET indexed as 4 is the dedicated CORESET. If the number of channel estimation exceeds the first maximum number, the UE may ignore the CORESET indexed 3. If the number of channel estimation still exceeds the first maximum number by ignoring the CORESET indexed as 3, the UE may further ignore the CORRSET indexed as 5.

In one embodiment, CORESET(s) in the second set may be determined based on REG bundle size of configured CORESETs in an active BWP. In particular, CORESET(s) in second set may be CORESET(s) with highest REG bundle size or top highest REG bundle size. If there is more than one CORESET with highest REG bundle size, CORESET in the second set are determined based on the order of CORESET index increasingly or decreasingly. If the number of channel estimation exceeds the first maximum number when the second set comprises the CORESET with the highest/lowest REG bundle size, the second set may include CORESET with second highest/lowest REG bundle size.

In one embodiment, CORESET(s) in the second set may be determined based on precoder granularity. Precoder granularity may be applied in frequency domain. More specifically, for a frequency resource located within precoder granularity, UE can view the frequency resource characterized with same precoder, same beam, and/or same channel response. In particular, CORESET(s) in the second set may be CORESET(s) with highest precoder granularity or top highest precoder granularity. If the number of channel estimation exceeds the first maximum number when the second set comprises the CORESET with the highest precoder granularity or top highest precoder granularity, the second set may include CORESET with second highest precoder granularity.

For example, a UE is configured with three CORESET(s) in the same slot in an active BWP, wherein the three CORESETs are indexed as 3, 4, and 5 respectively and the CORESET indexed as 5 is the dedicated CORESET. The precoder granularity of CORESET 3 is wideband and/or larger than precoder granularity of CORESET 4. If the number of channel estimation exceeds the first maximum number, the UE may ignore the CORESET indexed as 3. If the number of channel estimation still exceeds the first maximum number by ignoring the CORESET indexed as 3, the UE may ignore the CORESET indexed as 4.

In one embodiment, CORESET(s) in the second set may be determined based on the number of resource element of configured CORESETs in an active BWP. In particular, CORESET(s) in the second set may be CORESETs with the largest number of resource elements or the top largest number of resource elements. If the number of channel estimation exceeds the first maximum number when the second set comprises the CORESET with the largest number of resource element, the second set may comprise CORESET with second largest number of resource element.

In one embodiment, CORESET(s) in the second set may be determined based on number of CCE of configured CORESETs in an active BWP. In particular, CORESET(s) in the second set may be with largest number of CCE. If the number of channel estimation exceeds the first maximum number when the second set comprises the CORESET with the largest number of CCE, the second set may include CORESET with second largest number of CCE.

In one embodiment, the UE may jointly consider REG bundle size, number of CCE in a CORRSET, CORESET index, number of resource element in a CORESET, and precoder granularity of a CORESET to determine CORESET prioritization when the highest prioritization is applied for the dedicated CORESET.

In a summary, any following one or any following combination can be used to determine prioritization rule of CORESET monitoring when UE is performing BFR procedure. In general, the dedicated CORESET may have the highest prioritization.

Number of channel estimation attempts
REG bundle size
Precoder granularity of a CORESET
Number of CCE in a CORESET
CORESET index
Number of resource element in a CORESET
Number of overlapping resource elements with a dedicated CORESET (i.e. BFR CORESET)
Bandwidth of a CORESET
Number of search space
Monitoring occasion
Blind decode attempts
Number of PDCCH candidate
CCE Aggregation level In one embodiment, the UE may ignore a third set of PDCCH candidate(s). The UE may not receive, monitor, and/or demodulate the third set. The UE may de-prioritize to receive the third set. The UE may not receive, monitor, and/or demodulate the third set to reduce the number of blind decode to be smaller than or equal to the second maximum number. The PDCCH candidate(s) in the third set may be located in a prioritized CORESET(s), wherein the prioritized CORESET(s) is CORESET(s) with prioritization for channel estimation performed. The third set may exclude the PDCCH candidates in the dedicated CORESET. The UE skips monitoring, receiving, and/or demodulating the third set.

In one embodiment, the PDCCH candidate(s) in the third set may be determined to meet the capability of blind decode. The UE is not expected to ignore PDCCH candidate(s) in the dedicated CROESET. The UE may ignore some PDCCH candidate(s) in the dedicated CORESET if the number of blind decode exceeds the second maximum number even when all PDCCH candidate(s) in CORESET(s) excluding the dedicated CORESET in an activated BWP are ignored.

In one embodiment, the PDCCH candidate(s) in the third set may be configured by network. The PDCCH candidate(s) in the third set could be determined by the increasing or decreasing order of search space index of search spaces configured in an active BWP.

In one embodiment, the PDCCH candidate(s) in the third set may comprise PDCCH candidate(s) belonging to search space(s) with the lowest/highest search space index in a BWP or the top lowest/highest search space index in a BWP. If the number of blind decode exceeds the second maximum number when the third set comprises a search space with the lowest or highest search space index among all search spaces configured in the activated BWP, the third set may comprise a search space with second lowest or second highest search space index among all search spaces configured in the activated BWP.

For example, if a UE is configured with 10 search space in an active BWP which can be indexed as 10 to 19 and the search space with search space index 12 is belonging to the dedicated CORESET, the UE may monitor PDCCH candidate(s) in the search space belonging to a CORESET and skip PDCCH candidate(s) in remaining 9 search spaces. In this example, the PDCCH candidates in the third set may be PDCCH candidate(s) in search space with lowest index in the BWP (i.e. search space index 10). If number of blind decode still exceeds the second maximum number when the third set includes PDCCH candidate(s) in search space with index 10, the third set may include the second lowest index in the BWP (i.e. search space index 11). In the same example, the UE is not expected to include PDCCH candidate(s) in the search space with search space index 12 into the third set. In the same example, if the number of blind decode exceeds the second maximum number when the third set comprises PDCCH candidate(s) in the search space with search space index 10 and index 11, the third set may include PDCCH candidate(s) in search space with search space index 13.

In one embodiment, the third set may comprise PDCCH candidate(s) in search space with largest blind decode attempt(s). If the number of blind decode exceeds the second maximum number by comprising a search space with the largest blind decode attempt(s) among all search spaces configured in the activated BWP, the third set may comprise a search space with second largest blind decode attempt(s) among all search spaces configured in the activated BWP.

For example, if a UE is configured with at most 10 search space in an BWP which can be indexed as 10 to 19 and search space with search space index 12 is belonging to the dedicated CORESET, the UE may monitor PDCCH candidate(s) in the search space belonging to a CORESET and skip a number of PDCCH candidate(s) in remaining 9 search spaces. In this example, assuming that search space with search space index {10,11,13,14,15,16,17,18,19} has corresponding blind decode attempts {10, 4, 8, 12, 6, 6, 8, 10, 6}, the third set comprises PDCCH candidates in search space 14. The third set may comprise PDCCH candidate(s) until satisfying the capability of blind decode.

In one embodiment, the third set may comprise PDCCH candidate(s) with lowest CCE aggregation level. In particular, the third set may comprise PDCCH candidate(s) in UE-specific search space. The number of PDCCH candidate(s) may comprise PDCCH candidate(s) in common search space. If there are more than one common search spaces excluding search space(s) in the dedicated CORESET, the third set may include PDCCH candidate(s) in common search space and with the (top) lowest or highest search space index in a BWP.

In one embodiment, the third set may comprise PDCCH candidate(s) in UE-specific search space. If there are more than one UE-specific search spaces, the third set may include PDCCH candidate(s) in UE-specific search space with lowest or highest search space index in a BWP.

In one embodiment, the third set may comprise PDCCH candidate(s) in search space with largest number of monitoring occasion. More specifically, monitoring occasion(s) of a CORESET in a slot can be configured via a bit-map, wherein value of 1 in the bit-map indicates a starting OFDM symbol of a monitoring occasion of the CORESET in a slot.

In one embodiment, the third set may comprise PDCCH candidate(s) in search space with the largest number of PDCCH candidate(s). A scaling number can be used to reduce blind decode attempts. The scaling number may be in order to meet the capability of blind decode. The scaling number may not apply on PDCCH candidate(s) in the dedicated CORESET.

In a summary, any following one or any following combination can be used to determine prioritization rule for blind decode of PDCCH candidate in search space in CORESET(S). In general, search space(s) in the dedicated CORESET may have highest prioritization.
  Number of channel estimation attempts
  Monitoring occasion
  Blind decode attempts
  Number of PDCCH candidate
  CCE aggregation level
  UE-specific search space or common search space In one embodiment, NW could configure BFR SS as CSS. NW would configure BFR ss as a search space with largest/smallest number of channel estimation attempts. If the number of channel estimation exceeds the first maximum number and/or the number of blind decode exceeds the second maximum number, the UE could ignore CORESET(s) and/or PDCCH candidates based on joint consideration of channel estimation and/or blind decode.

In one embodiment, the dedicated CORESET can be the CORESET with the lowest CORESET index. More specifically, if blind decoding and/or channel estimation prioritization is determined based on at least CORESET index, the dedicated CORESET can be the CORESET with the lowest CORESET index.

Alternatively, the dedicated CORESET can be the CORESET with the highest CORESET index. More specifically, if blind decoding and/or channel estimation prioritization is determined based on at least CORESET index, the dedicated CORESET can be the CORESET with the highest CORESET index.

In one embodiment, search space(s) in the dedicated CORESET can be the search space with the (top) lowest search space index(s). Alternatively, search space(s) in the dedicated CROESET can be the search space with the (top) highest search space index(s).

In the above description, the beam failure recovery procedure could mean or be replaced with a procedure for reconnecting or reconfiguring the link between UE and NW(or base station), e.g. a link reconfiguration procedure. The link can be a beam, beam pair link. The preamble can be a beam failure recovery request. The response can be a BFR response, a gNB response. In addition, a slot can be replaced with a type of time unit, e.g. a subframe, a symbol, a frame.

Figure 10:
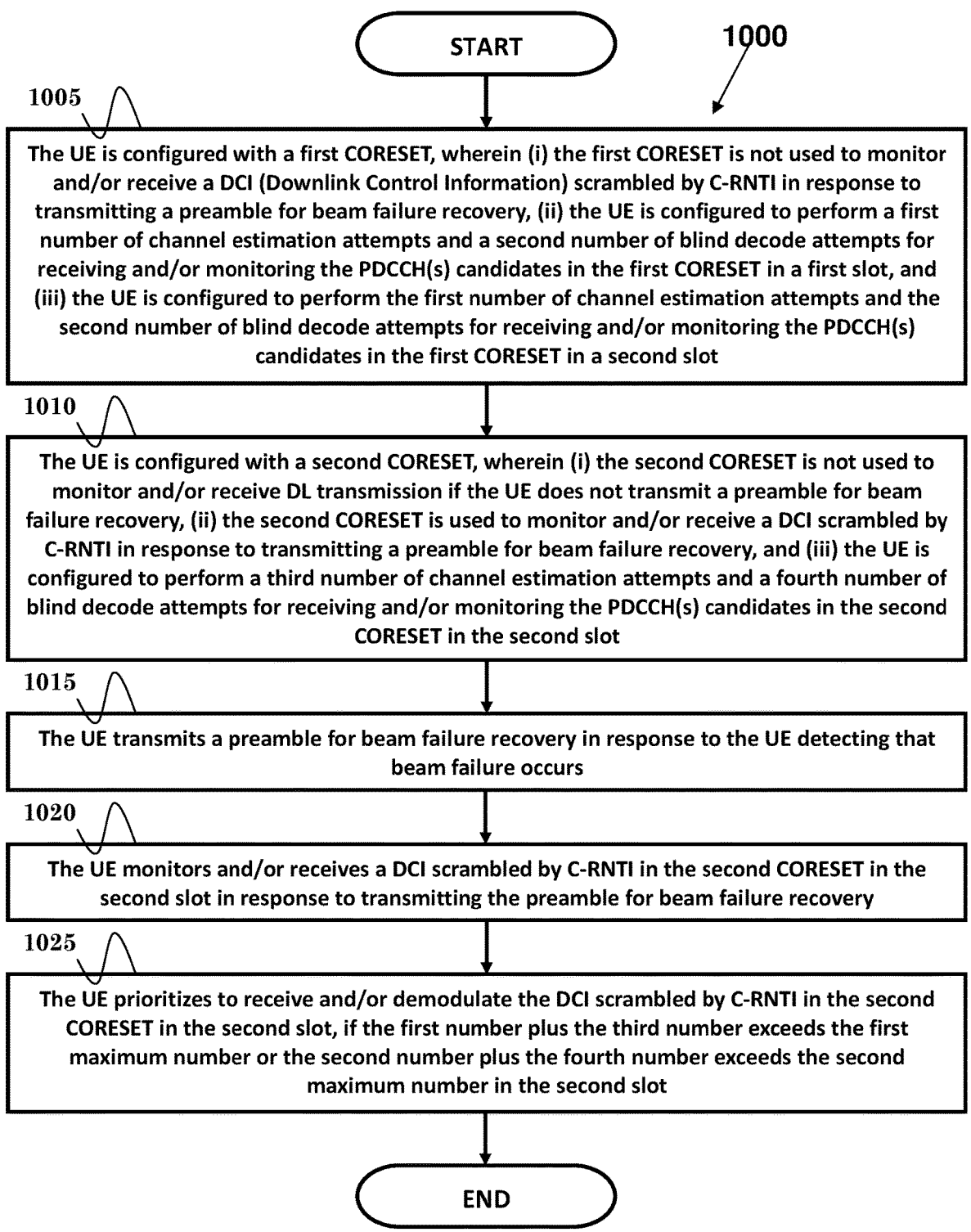
FIG. 10 is a flow chart according to one exemplary embodiment.

FIG. 10 is a flow chart 1000 according to one exemplary embodiment from the perspective of a UE. In step 1005, the UE is configured with a first CORESET, wherein (i) the first CORESET is not used to monitor and/or receive a DCI scrambled by C-RNTI in response to transmitting a preamble for beam failure recovery, (ii) the UE is configured to perform a first number of channel estimation attempts and a second number of blind decode attempts for receiving and/or monitoring the PDCCH(s) candidates in the first CORESET in a first slot, and (iii) the UE is configured to perform the first number of channel estimation attempts and the second number of blind decode attempts for receiving and/or monitoring the PDCCH(s) candidates in the first CORESET in a second slot. In step 1010, the UE is configured with a second CORESET, wherein (i) the second CORESET is not used to monitor and/or receive DL transmission if the UE does not transmit a preamble for beam failure recovery, (ii) the second CORESET is used to monitor and/or receive a DCI scrambled by C-RNTI in response to transmitting a preamble for beam failure recovery, and (iii) the UE is configured to perform a third number of channel estimation attempts and a fourth number of blind decode attempts for receiving and/or monitoring the PDCCH(s) candidates in the second CORESET in the second slot. In step 1015, the UE transmits a preamble for beam failure recovery in response to the UE detecting that beam failure occurs. In step 1020, the UE monitors and/or receives a DCI scrambled by C-RNTI in the second CORESET in the second slot in response to transmitting the preamble for beam failure recovery. In step 1025, the UE prioritizes to receive and/or demodulate the DCI scrambled by C-RNTI in the second CORESET in the second slot, if the first number plus the third number exceeds the first maximum number or the second number plus the fourth number exceeds the second maximum number in the second slot.

In one embodiment, the first maximum number could be the maximum number of channel estimation attempts in a slot. The second maximum number could be the maximum number of blind decode attempts in a slot.

In one embodiment, the first CORESET could be associated with a first search space and the second CORESET is associated with a second search space. The second search space could be configured such that PDCCH candidates in the second search space is not deprioritized, when the first number plus the third number exceeds the first maximum number or the second number plus the fourth number exceeds the second maximum number in the second slot. The UE could set or consider the second search space as having the highest priority. The second search space could be a common search space.

In one embodiment, the UE could prioritize to receive and/or demodulate the DCI scrambled by C-RNTI in the second CORESET in the second slot, if the first number plus the third number exceeds the first maximum number or the second number plus the fourth number exceeds the second maximum number in the second slot, wherein the second search space associated with the second CORESET is UE-specific search space. Furthermore, the UE could prioritize to receive and/or demodulate the DCI scrambled by C-RNTI in the second CORESET in the second slot means that the UE does not drop or ignore the PDCCHs candidates in the second CORESET in the second slot.

In one embodiment, the UE could prioritize to receive and/or demodulate the DCI scrambled by C-RNTI in the second CORESET over receiving and/or demodulating PDCCHs candidates in one or more other CORESETs in the second slot, wherein at least one of the one or more other CORESETs is associated with a common search space or associated with a search space with the lowest search space ID.

Referring back to FIGS. 3 and 4, in one exemplary embodiment of a UE, the device 300 includes a program code 312 stored in the memory 310. The CPU 308 could execute program code 312 to enable the UE (i) to be configured with a first CORESET, wherein (a) the first CORESET is not used to monitor and/or receive a DCI scrambled by C-RNTI in response to transmitting a preamble for beam failure recovery, (b) the UE is configured to perform a first number of channel estimation attempts and a second number of blind decode attempts for receiving and/or monitoring the PDCCH(s) candidates in the first CORESET in a first slot, and (c) the UE is configured to perform the first number of channel estimation attempts and the second number of blind decode attempts for receiving and/or monitoring the PDCCH(s) candidates in the first CORESET in a second slot, (ii) to be configured with a second CORESET, wherein (a) the second CORESET is not used to monitor and/or receive DL transmission if the UE does not transmit a preamble for beam failure recovery, (b) the second CORE-SET is used to monitor and/or receive a DCI scrambled by C-RNTI in response to transmitting a preamble for beam failure recovery, and (c) the UE is configured to perform a third number of channel estimation attempts and a fourth number of blind decode attempts for receiving and/or monitoring the PDCCH(s) candidates in the second CORESET in the second slot, (iii) to transmit a preamble for beam failure recovery in response to the UE detecting that beam failure occurs, (iv) to monitor and/or receive a DCI scrambled by C-RNTI in the second CORESET in the second slot in response to transmitting the preamble for beam failure recovery, and (v) to prioritize to receive and/or demodulate the DCI scrambled by C-RNTI in the second CORESET in the second slot, if the first number plus the third number exceeds the first maximum number or the second number plus the fourth number exceeds the second maximum number in the second slot. Furthermore, the CPU 308 can execute the program code 312 to perform all of the above-described actions and steps or others described herein.

Figure 11:
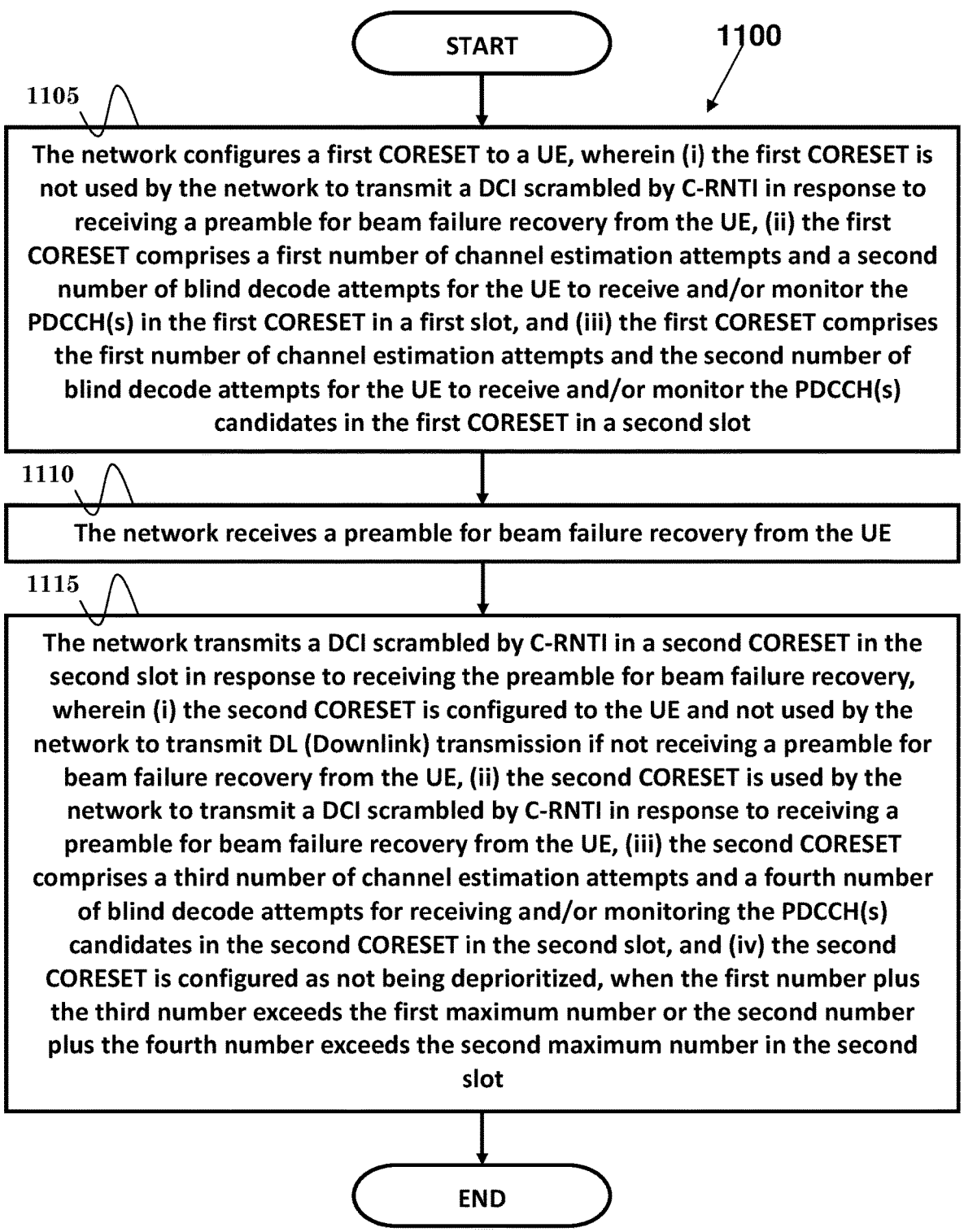
FIG. 11 is a flow chart according to one exemplary embodiment.

FIG. 11 is a flow chart 1100 according to one exemplary embodiment from the perspective of a network. In step 1105, the network configures a first CORESET to a UE, wherein (i) the first CORESET is not used by the network to transmit a DCI scrambled by C-RNTI in response to receiving a preamble for beam failure recovery from the UE, (ii) the first CORESET comprises a first number of channel estimation attempts and a second number of blind decode attempts for the UE to receive and/or monitor the PDCCH(s) in the first CORESET in a first slot, and (iii) the first CORESET comprises the first number of channel estimation attempts and the second number of blind decode attempts for the UE to receive and/or monitor the PDCCH(s) candidates in the first CORESET in a second slot. In step 1110, the network receives a preamble for beam failure recovery from the UE. In step 1115, the network transmits a DCI scrambled by C-RNTI in a second CORESET in the second slot in response to receiving the preamble for beam failure recovery, wherein (i) the second CORESET is configured to the UE and not used by the network to transmit DL (Downlink) transmission if not receiving a preamble for beam failure recovery from the UE, (ii) the second CORESET is used by the network to transmit a DCI scrambled by C-RNTI in response to receiving a preamble for beam failure recovery from the UE, (iii) the second CORESET comprises a third number of channel estimation attempts and a fourth number of blind decode attempts for receiving and/or monitoring the PDCCH(s) candidates in the second CORESET in the second slot, and (iv) the second CORESET is configured as not being deprioritized, when the first number plus the third number exceeds the first maximum number or the second number plus the fourth number exceeds the second maximum number in the second slot.

In one embodiment, the first maximum number may be the maximum number of channel estimation attempts in a slot. The second maximum number may be the maximum number of blind decode attempts in a slot.

In one embodiment, the first CORESET could be associated with a first search space and the second CORESET is associated with a second search space. The second search space could be configured such that PDCCH candidates in the second search space is not deprioritized, when the first number plus the third number exceeds the first maximum number or the second number plus the fourth number exceeds the second maximum number in the second slot.

In one embodiment, the network may configure the second search space with highest prioritization. The network may also configure the second search space to be a common search space or a UE-specific search space. Furthermore, the network may configure the second search space to include the lowest search space ID.

In one embodiment, PDCCH candidates in the second CORESET or the second search space are not deprioritized could mean that PDCCH candidates in the second CORESET or the second search space are not dropped or ignored.

Referring back to FIGS. 3 and 4, in one exemplary embodiment of a network node, the device 300 includes a program code 312 stored in the memory 310. The CPU 308 could execute program code 312 to enable the network node (i) to configure a first CORESET to a UE, wherein (a) the first CORESET is not used by the network to transmit a DCI scrambled by C-RNTI in response to receiving a preamble for beam failure recovery from the UE, (b) the first CORESET comprises a first number of channel estimation attempts and a second number of blind decode attempts for the UE to receive and/or monitor the PDCCH(s) in the first CORESET in a first slot, and (c) the first CORESET comprises the first number of channel estimation attempts and the second number of blind decode attempts for the UE to receive and/or monitor the PDCCH(s) candidates in the first CORESET in a second slot, (ii) to receive a preamble for beam failure recovery from the UE, and (iii) to transmit a DCI scrambled by C-RNTI in a second CORESET in the second slot in response to receiving the preamble for beam failure recovery, wherein (a) the second CORESET is configured to the UE and not used by the network to transmit DL (Downlink) transmission if not receiving a preamble for beam failure recovery from the UE, (b) the second CORESET is used by the network to transmit a DCI scrambled by C-RNTI in response to receiving a preamble for beam failure recovery from the UE, (c) the second CORESET comprises a third number of channel estimation attempts and a fourth number of blind decode attempts for receiving and/or monitoring the PDCCH(s) candidates in the second CORESET in the second slot, and (d) the second CORESET is configured as not being deprioritized, when the first number plus the third number exceeds the first maximum number or the second number plus the fourth number exceeds the second maximum number in the second slot. Furthermore, the CPU 308 can execute the program code 312 to perform all of the above-described actions and steps or others described herein.

Figure 12:
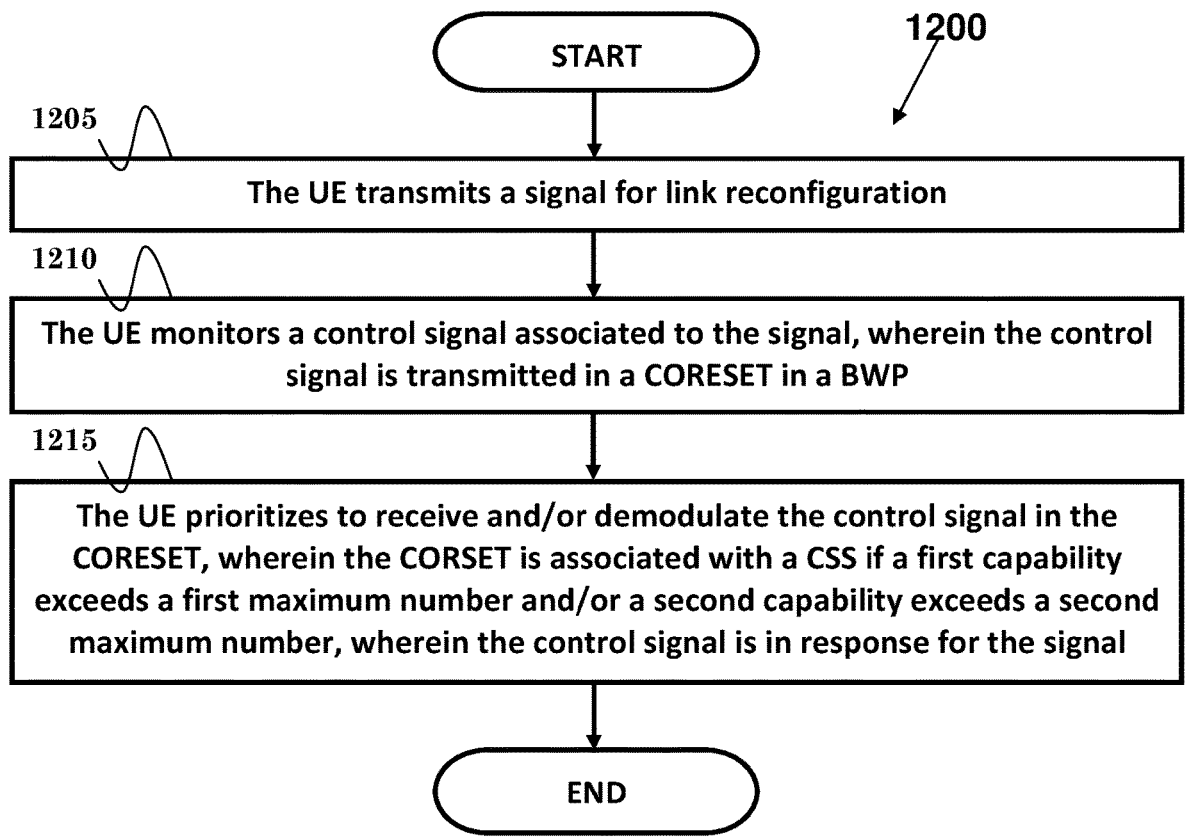
FIG. 12 is a flow chart according to one exemplary embodiment.

FIG. 12 is a flow chart 1200 according to one exemplary embodiment from the perspective of a UE. In step 1205, the UE transmits a signal for link reconfiguration. In step 1210, the UE monitors a control signal associated to the signal, wherein the control signal is transmitted in a CORESET in a BWP. In step 1251, the UE prioritizes to receive and/or demodulate the control signal in the CORESET, wherein the CORSET is associated with a CSS if a first number exceeds a first maximum number and/or a second number exceeds a second maximum number, wherein the control signal is in response for the signal.

In one embodiment, the BWP could be an activated BWP. The UE could be configured with at least a BWP. The maximum CORESET number configured in a BWP could be three.

In one embodiment, the UE could receive and/or demodulate the CORESET if the UE transmits the signal. In particular, the UE could receive and/or demodulate the control signal via a reference signal. Furthermore, the UE could be configured to receive a first group of CORESET(s) in the BWP via a second group of reference signal(s). The first group of CORESET(s) could exclude the CORESET. The size of the first group of CORESET(s) could be one, two, or three. In one embodiment, the CORESET could be within the first group. The CORESET could be used for receiving the response of the signal. The second group of reference signal(s) could exclude the reference signal.

In one embodiment, the UE could transmit the signal when the UE reaches a number for fail receiving control signal(s) via the second group of the reference signal. The control signal could be addressed to C-RNTI. Furthermore, the control signal could be in common search space and/or UE-specific search space in the CORESET. The signal could be a preamble. The signal could also be associated to the reference signal.

In one embodiment, the second number could be blind decode attempts for a PDCCH candidate. The first number could be channel estimation attempts for a PDCCH candidate. The first number could be a CCE number that the UE is configured to process in a time unit, e.g. slot.

In one embodiment, the second number could be a PDCCH candidate number that the UE is configured to process, monitor, or blind decode in a time unit, e.g. slot. The time unit could be a slot. The time unit could also be fixed. In particular, the time unit could be 1 millisecond.

In one embodiment, the first maximum number could be based on subcarrier spacing of the BWP. The first maximum number could be fixed. Furthermore, tfirst maximum number could be the maximum CCE number that the UE can process in the time unit.

In one embodiment, the second maximum number could be based on subcarrier spacing of the BWP. The second maximum number could be fixed. Furthermore, the second maximum number could be the maximum PDCCH candidate number which the UE can process in the time unit.

In one embodiment, the UE may start to receive and/or demodulate the control signal in the CORESET after 4 slots from that the UE transmits the signal. If the first number exceeds the first maximum number, the UE could ignore a first set of control channel elements (CCE) in the first group of CORESET(s). If the first number exceeds the first maximum number, the UE (i) could receive and/or demodulate the first group excluding the first set of CCE and/or the UE receives and/or demodulates the CORESET, and/or (ii) could skip receiving and/or demodulating and/or monitoring the first set of CCE(s).

In one embodiment, if the first number exceeds the first maximum number, the UE may not ignore CCE(s) in the CORESET for receiving the control signal, or may ignore some CCE(s) in the CORESET for receiving the control signal when all CCE(s) in the first group) is ignored; wherein the some CCE(s) are determined to meet the first maximum number. Alternatively, if the first number exceeds the first maximum number, the UE may not be expected to ignore CCE(s) in the CROESET for receiving the control signal.

In one embodiment, the third set may comprise CCEs in the first group. The first set may comprise minimum CCE number in the first group. The size of the first set may be configured by a network.

In one embodiment, the first set may comprise CCE(s) which is not overlapped with the CORESET. In particular, the first set may be partial or all CCE(s) belonging to a CORESET with a smaller/larger CORESET index in the first group. The first set may also be partial or all CCE(s) belonging to a CORESET in the first group which occupies the most resource element(s) and/or has the most monitoring occasion(s) in a slot.

In one embodiment, the UE could receive and/or demodulate the first group of CORESETs excluding the first set via the second group of reference signal(s), and could receive and/or demodulate the CORESET via the reference signal. If the second number exceeds the second maximum number, the UE could ignore a second set of PDCCH candidates in the first group of CORESET(s), and could skip receiving and/or demodulating and/or monitoring the second set.

In one embodiment, if the second number exceeds the second maximum number, the second set of PDCCH candidate(s) may be ignored in order to meet the second maximum number, and the UE could receive and/or demodulate the first group excluding the second set of PDCCH candidates and/or the UE receives and/or demodulates the CORESET.

In one embodiment, if the second number exceeds the second maximum number, the UE may not ignore PDCCH candidate(s) in the CORESET for receiving the control signal. Alternatively, if the second number exceeds the second maximum number, the UE may ignore PDCCH candidate (s) in the CORESET for receiving the control signal when all PDCCH candidate(s) in the first group of CORESET(s) is ignored. Alternatively, if the second number exceeds the second maximum number, the UE may not be expected to ignore PDCCH candidate(s) in the CORESET for receiving the control signal.

In one embodiment, the size of the second set may be determined by the minimum number of PDCCH candidate(s), and may be configured by a network. The second set may comprise partial or all PDCCH candidate(s) belonging to a CORESET with a smaller/larger CORESET index in the first group of CORESET(s). Furthermore, the second set may comprise partial or all PDCCH candidate(s) belonging to a CORESET in the first group of CORESET(s) which has the most PDCCH candidate(s) and/or has the most monitoring occasion(s) in a slot. In addition, the second may comprise partial or all PDCCH candidate(s) belonging to a CORESET in the first group of CORESET(s) which has the lowest/the highest CCE aggregation level(s) and/or the second lowest/second highest CCE aggregation level if needed.

Referring back to FIGS. 3 and 4, in one exemplary embodiment of a UE, the device 300 includes a program code 312 stored in the memory 310. The CPU 308 could execute program code 312 to enable the UE (i) to transmit a signal for link reconfiguration, (ii) to monitor a control signal associated to the signal, wherein the control signal is transmitted in a CORESET in a BWP, and (iii) to prioritize to receive and/or demodulate the control signal in the CORESET, wherein the CORSET is associated with a CSS if a first number exceeds a first maximum number and/or a second number exceeds a second maximum number, wherein the control signal is in response for the signal. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
   the UE is configured with a first CORESET (Control Resource Set), wherein (i) the first CORESET is not used to monitor and/or receive a DCI (Downlink Control Information) scrambled by C-RNTI (Cell Radio Network Temporary Identifier) in response to transmitting a preamble for beam failure recovery, (ii) the UE is configured to perform a first number of channel estimation attempts and a second number of blind decode attempts for receiving and/or monitoring the PDCCH(s) (Physical Downlink Control Channel) candidates in the first CORESET in a first slot, and (iii) the UE is configured to perform the first number of channel estimation attempts and the second number of blind decode attempts for receiving and/or monitoring the PDCCH(s) candidates in the first CORESET in a second slot;
   the UE is configured with a second CORESET, wherein (i) the second CORESET is not used to monitor and/or receive DL (Downlink) transmission if the UE does not transmit a preamble for beam failure recovery, (ii) the second CORESET is used to monitor and/or receive a DCI scrambled by C-RNTI in response to transmitting a preamble for beam failure recovery, and (iii) the UE is configured to perform a third number of channel estimation attempts and a fourth number of blind decode attempts for receiving and/or monitoring the PDCCH(s) candidates in the second CORESET in the second slot;
   the UE transmits a preamble for beam failure recovery in response to the UE detecting that beam failure occurs;
   the UE monitors and/or receives a DCI scrambled by C-RNTI in the second CORESET in the second slot in response to transmitting the preamble for beam failure recovery; and
   the UE prioritizes to receive and/or demodulate the DCI scrambled by C-RNTI in the second CORESET in the second slot, if the first number plus the third number exceeds the first maximum number or the second number plus the fourth number exceeds the second maximum number in the second slot.

2. The method of claim 1, wherein the first maximum number is maximum number of channel estimation attempts in a slot.

3. The method of claim 1, wherein the second maximum number is maximum number of blind decode attempts in a slot.

4. The method of claim 1, wherein the first CORESET is associated with a first search space and the second CORESET is associated with a second search space.

5. The method of claim 4, wherein the second search space is configured such that PDCCH candidates in the second search space is not deprioritized, when the first number plus the third number exceeds the first maximum number or the second number plus the fourth number exceeds the second maximum number in the second slot.

6. The method of claim 4, wherein the UE sets or considers the second search space as having the highest priority.

7. The method of claim 4, wherein the second search space is a common search space.

8. The method of claim 1, wherein the UE prioritizes to receive and/or demodulate the DCI scrambled by C-RNTI in the second CORESET in the second slot, if the first number plus the third number exceeds the first maximum number or the second number plus the fourth number exceeds the second maximum number in the second slot, wherein the second search space associated with the second CORESET is UE-specific search space.

9. The method of claim 1, wherein the UE prioritizes to receive and/or demodulate the DCI scrambled by C-RNTI in the second CORESET in the second slot means that the UE does not drop or ignore the PDCCHs candidates in the second CORESET in the second slot.

10. The method of claim 1, wherein the UE prioritizes to receive and/or demodulate the DCI scrambled by C-RNTI in the second CORESET over receiving and/or demodulating PDCCHs candidates in one or more other CORESETs in the second slot, wherein at least one of the one or more other CORESETs is associated with a common search space or associated with a search space with the lowest search space ID (Identity).

11. A method for a network, comprising:
    the network configures a first CORESET (Control Resource Set) to a UE (User Equipment), wherein (i) the first CORESET is not used by the network to transmit a DCI (Downlink Control Information) scrambled by C-RNTI (Cell Radio Network Temporary Identifier) in response to receiving a preamble for beam failure recovery from the UE, (ii) the first CORESET comprises a first number of channel estimation attempts and a second number of blind decode attempts for the UE to receive and/or monitor the PDCCH(s) (Physical Downlink Control Channel) in the first CORESET in a first slot, and (iii) the first CORESET comprises the first number of channel estimation attempts and the second number of blind decode attempts for the UE to receive and/or monitor the PDCCH(s) candidates in the first CORESET in a second slot;

the network receives a preamble for beam failure recovery from the UE; and the network transmits a DCI scrambled by C-RNTI in a second CORESET in the second slot in response to receiving the preamble for beam failure recovery, wherein (i) the second CORESET is configured to the UE and not used by the network to transmit DL (Downlink) transmission if not receiving a preamble for beam failure recovery from the UE, (ii) the second CORESET is used by the network to transmit a DCI scrambled by C-RNTI in response to receiving a preamble for beam failure recovery from the UE, (iii) the second CORESET comprises a third number of channel estimation attempts and a fourth number of blind decode attempts for receiving and/or monitoring the PDCCH(s) candidates in the second CORESET in the second slot, and (iv) the second CORESET is configured as not being deprioritized, when the first number plus the third number exceeds the first maximum number or the second number plus the fourth number exceeds the second maximum number in the second slot.

12. The method of claim 11, wherein the first maximum number is maximum number of channel estimation attempts in a slot.

13. The method of claim 11, wherein the second maximum number is maximum number of blind decode attempts in a slot.

14. The method of claim 11, wherein the first CORESET is associated with a first search space and the second CORESET is associated with a second search space.

15. The method of claim 14, wherein the second search space is configured such that PDCCH candidates in the second search space is not deprioritized, when the first number plus the third number exceeds the first maximum number or the second number plus the fourth number exceeds the second maximum number in the second slot.

16. The method of claim 14, wherein the network configures the second search space to have the highest priority.

17. The method of claim 14, wherein the network configures the second search space to be a common search space.

18. The method of claim 14, wherein PDCCH candidates in the second CORESET or the second search space are not deprioritized means that PDCCH candidates in the second CORESET or the second search space are not dropped or ignored.

19. The method of claim 14, wherein the network configures the second search space to be a UE-specific search space.

20. The method of claim 14, wherein the network configures the second search space to include the lowest search space ID (Identity).

* * * * *